United States Patent
Enomoto et al.

(10) Patent No.: US 7,302,473 B1
(45) Date of Patent: Nov. 27, 2007

(54) INTERNET INFORMATION DISPLAYING APPARATUS AND INTERNET INFORMATION DISPLAYING METHOD

(75) Inventors: Mitsunobu Enomoto, Nara (JP); Nobuo Kuchiki, Nishinomiya (JP); Yuji Hase, Sijyonawate (JP); Yoshinori Hama, Kyoto (JP); Takashige Wakamatsu, Toyonaka (JP); Masashi Yagi, Amagasaki (JP)

(73) Assignee: Sanyo Electric Co., Ltd., Osaka (JP)

(*) Notice: Subject to any disclaimer, the term of this patent is extended or adjusted under 35 U.S.C. 154(b) by 532 days.

(21) Appl. No.: 09/393,576

(22) Filed: Sep. 10, 1999

Related U.S. Application Data

(62) Division of application No. 08/890,512, filed on Jul. 9, 1997, now Pat. No. 6,026,435.

(30) Foreign Application Priority Data

| Jul. 12, 1996 | (JP) | .................................. 8-183569 |
| Aug. 5, 1996 | (JP) | .................................. 8-206223 |
| Sep. 6, 1996 | (JP) | .................................. 8-236795 |
| Sep. 26, 1996 | (JP) | .................................. 8-255050 |

(51) Int. Cl.
*H04N 1/40* (2006.01)

(52) U.S. Cl. ..................... 709/207; 709/224; 709/228; 358/401; 345/149

(58) Field of Classification Search ............... 709/201, 709/203, 224, 227, 226, 207, 228; 345/333, 345/607, 149; 434/307; 710/10, 14; 713/10; 358/451, 1.9, 452, 149, 401, 448; 715/853; 348/352

See application file for complete search history.

(56) References Cited

U.S. PATENT DOCUMENTS 5,339,391 A * 8/1994 Wroblewski et al. ....... 345/607
5,353,121 A 10/1994 Young et al. ................. 725/52
5,363,211 A * 11/1994 Hasebe et al. .............. 358/451
5,363,481 A 11/1994 Tilt ............................ 345/352
5,491,781 A * 2/1996 Gasperina ................... 709/205
5,675,390 A * 10/1997 Schindler et al. ........... 348/552

(Continued)

FOREIGN PATENT DOCUMENTS

| EP | 0 457 990 A2 | 11/1991 |
| EP | 0 476 972 A2 | 3/1992 |
| JP | 4-334835 | 11/1992 |
| KR | 98-7677 | 3/1998 |

OTHER PUBLICATIONS

"Internet Handbook for Corporate Users", Nikkei Communications, Nov. 30, 1994, published by Nikkei BP.
"Web TV and its Consumer Electronics Licensees Debut First Internet Television Network and Set Top Box", Available from Internet, Jul. 10, 1996, XP002086521; http://webtv.net/company/media center/lice; nse.htm].

(Continued)

*Primary Examiner*—Khanh Dinh
(74) *Attorney, Agent, or Firm*—Arent Fox, LLP

(57) ABSTRACT

An Internet information displaying apparatus comprising character signal generating means for generating a character signal and displaying it on the screen of the displaying means, and character signal generation controlling means for detecting the state of transmission and reception of digital data of the digital data transmitting and receiving means, and controlling the character signal generating means so as to generate a character signal to indicate the transmission or reception state. The state of transmission or reception of the digital data of the digital data transmitting and receiving means, in other words, the state of connection to the provider is displayed on the screen.

9 Claims, 38 Drawing Sheets

U.S. PATENT DOCUMENTS

| | | | | |
|---|---|---|---|---|
| 5,724,412 A | | 3/1998 | Srinivasan | 379/93.23 |
| 5,790,548 A | | 8/1998 | Sistanizadeh et al. | 370/401 |
| 5,805,272 A | * | 9/1998 | Nozawa et al. | 355/25 |
| 5,821,926 A | * | 10/1998 | Arita | 345/333 |
| 5,822,216 A | | 10/1998 | Satchell, Jr. et al. | 364/479.02 |
| 5,832,223 A | | 11/1998 | Hara et al. | 709/217 |
| 5,838,973 A | * | 11/1998 | Carpenter-Smith et al. | 709/203 |
| 5,845,074 A | | 12/1998 | Kobata | 709/229 |
| 5,898,819 A | * | 4/1999 | Austin et al. | 358/1.9 |
| 5,911,582 A | * | 6/1999 | Redford et al. | 434/307 |
| 5,920,317 A | * | 7/1999 | McDonald | 715/853 |
| 6,034,689 A | | 3/2000 | White et al. | 345/854 |
| 6,052,239 A | * | 4/2000 | Matsui et al. | 359/802 |
| 6,418,532 B2 | * | 7/2002 | Redford | 713/2 |

OTHER PUBLICATIONS

Hirtz G et al: "Open TV: Betriebssystem Fuer Interaktives Fernsehen", *Fernseh Und Kinotechnik* vol. 50, No. 3, Mar. 1, 1996, pp. 84-89, XP000581417, p. 85, left-hand column, paragraph 4—right-hand column, paragraph 2.

Richard K. et al: "GUI Web Browsers" UNIX Review, Jul. 1, 1995, pp. 69-74, XP000600159, p. 71, left-hand column, paragraph 2.

"Netscape Handbook: Before you begin", available from Internet, Apr. 29, 1996, XP002086522, p. 5, paragraph 1.

Kamata, "Built-In Real Time Technology in Internet Home Appliance", *Interface,* vol. 22, No. 5, pp. 131-135 (Jun. 1, 1996).

"Kuni Research International: Air Navigator", *Computer & Network LAN, Japan*, vol. 13, Issue 4, pp. 122-123 (Apr. 1, 1995).

Forschung & Entwicklung, *"Multimedia-Terminal als Endgerät"* 202 Funkschau, 1 Maerz, No. 6, Feldkirchen, DE, pp. 70-76 (1996).

* cited by examiner

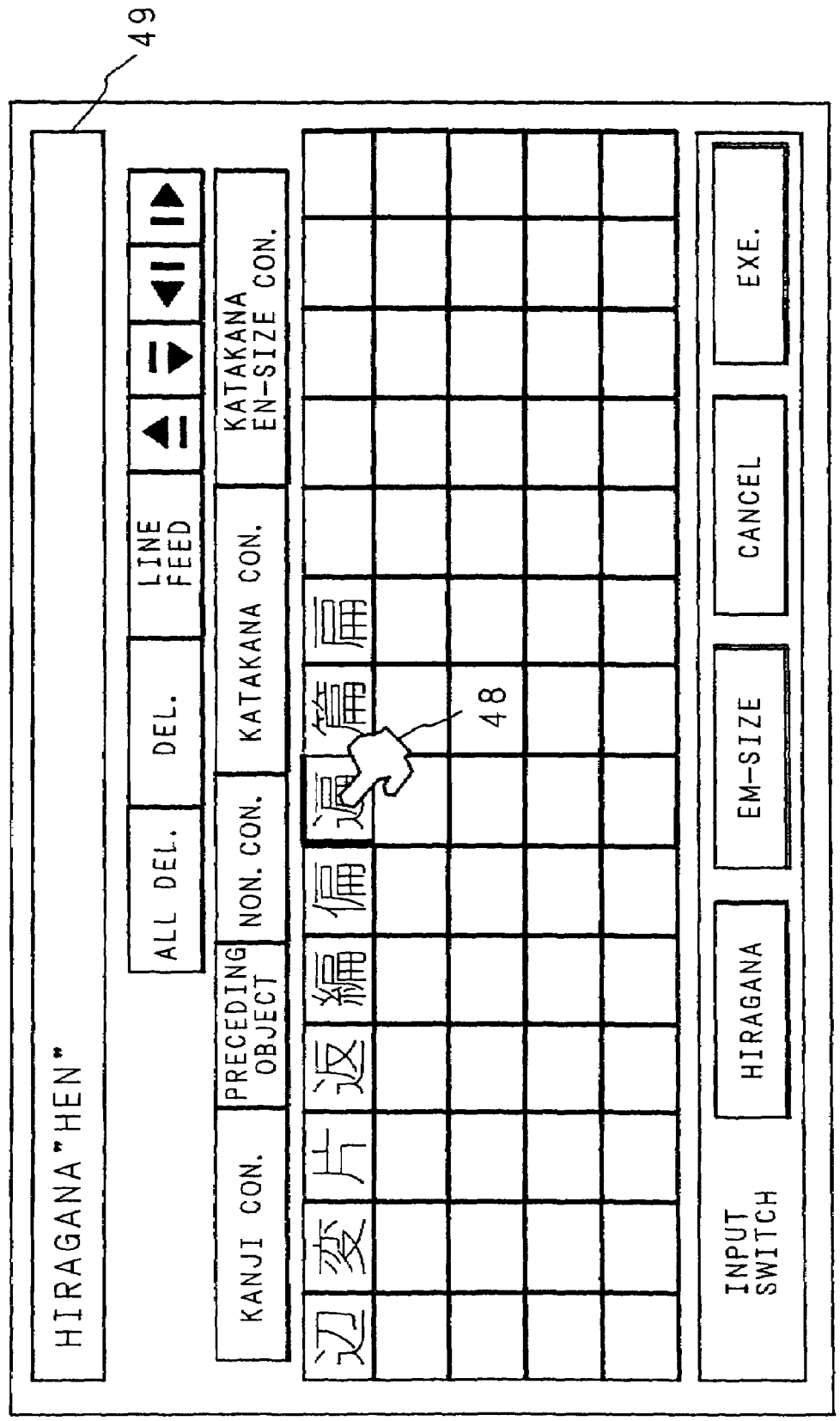

INTERNET INFORMATION DISPLAYING APPARATUS AND INTERNET INFORMATION DISPLAYING METHOD

This application is a divisional application filed under 37 CFR § 1.53(b) of parent application Ser. No. 08/890,512, filed Jul. 9, 1997 now U.S. Pat. No. 6,026,435.

BACKGROUND OF THE INVENTION

The present invention relates to an Internet information displaying apparatus and method for receiving information through the Internet, taking in the information, converting into picture signals, and displaying on a CRT display or the like.

Recently, owing to the wide popularity of personal computers, information is transmitted and received widely by using the Internet.

The Internet is a network of multiple computers connected on a global scale, and various pieces of readable information are stored in individual computers. These pieces of information include E-mails, various programs, and home pages, which can be communicated in two ways. The home page corresponds to the title and table of contents of a piece of information, and by selecting a graphic pattern (icon) or a word on the home page, the necessary information can be reviewed.

Therefore, recently, more an more users are using the Internet as the site of information presentation. It is the WWW (World Wide Web) that is noticed as the server for providing such information.

The reason why the WWW server is drawing attention is mainly due to the wide spread of the client software (browser) for retrieving information by using a graphical menu. By the development of such browser, it becomes easier to search information on the network, and the traffic volume to the WWW server increased rapidly, and the users have come to notice as the publicity media, and many users have come to use.

To read information of the WWW server, as mentioned above, the browser is needed. For example, the browser is disclosed in pages 164 to 167 of "Internet Handbook for Corporate Users", an extra output of Nikkei Communications published by Nikkei BP (Nov. 30, 1994).

On the other hand, to review the information of WWW server by the Internet, conventionally, it was necessary to install the browser in the personal computer.

FIG. 1 is a schematic diagram showing a conventional connection example of computer and Internet. In this connection example, a personal computer 7 is connected to a communication line 2 through a modem 8 or a terminal adapter, and through the communication line 2, it is further connected to a modem 3 or a terminal adapter of a provider which is a connection service firm. The modem 3 is connected to a server 4 which is the computer of the provider.

The server 4 is connected to the Internet 6 around the clock, and is connected to the Internet 6 through a router 5 for setting a trunk route.

From the personal computer 7, a telephone call is made when necessary, and a connection is made to the Internet 6 through the server 4 of the provider (dial-up connection).

Among those not owning personal computer, there are many people wanting to use the Internet, but not daring to buy a personal computer. Some are hesitant to operate the personal computer. Among those people, it seems many people want to use the Internet, if possible, without using the personal computer.

In such background, lately, the Internet television allowing to use the Internet easily by the television receiver is proposed. That is, the Internet information is displayed by using the television receiver in the general household as the display of the personal computer. Accordingly, without having to purchase a personal computer, only a device for receiving the Internet information is built in or attached to the television receiver, and such device is easy to handle as compared with the personal computer, and the television receiver functions its original purpose while not reviewing the Internet information, which is very convenient for the user.

However, to review the information of WWW server of the Internet by such television receiver, it is necessary to connect once to the provider through the communication line. Only by connecting the communication line with the provider, the information can be acquired.

This connection by the communication line is made through a modem, and the users of personal computer who make communications can judge if connection is made or not as follows. That is, since the modem is sending data by sound, it is judged if the data is communicated or the telephone is connected by the sound.

Incidentally, when a function for receiving the Internet is incorporated in the television receiver, it is possible to wait while watching the television broadcast while connecting to the provider, and such function is generally desired because the user can wait without being bored until connected.

However, while receiving the television broadcast by the television receiver, usually, since the sound of the television broadcast is delivered through the speakers of the television receiver, when connecting the communication line, it is impossible to judge if connected or not by the sound delivered from the modem because of the sound of the television broadcast delivered from the speakers.

Or, if the television program is displayed on the screen with the communication line connected to the Internet, since the television broadcast is displayed by the television receiver, the user is devoted to the broadcast, and may forget that the communication line is connected to the Internet. In particular, when the provider side is busy and information is not transmitted, the communication line remains connected, and the charge of the communication line is increased unknowingly.

Even when displaying the screen relating to the Internet, the user may forget that the communication line is connected to the Internet, and the telephone charge is spent purposelessly.

If the television broadcast is terminated while displaying the television broadcast and Internet screen simultaneously, it is preferred that the Internet screen may be shown in the entire display area.

Further, when reviewing the information of WWW server of the Internet by the television receiver in this way, it is seen by the browser as mentioned above. However, the screen display of the ordinary browser is prepared for the personal computer, and the display is small. In particular, the tool bar and buttons are shown in a very small size. This is because the personal computer is mainly used by a person, and operated by the user near the screen, and even a small display can be recognized sufficiently.

By contrast, since the television receiver is usually seen by the user at a certain distance, if this browser is displayed in the television receiver, the tool bar is displayed small and is hard to see. Hence, operation by the tool bar is difficult.

Once the communication line is connected, data is sent from the provider side. But the user does not know how the data is transmitted, and has no means for checking if all data has been transmitted or not. In the browser for the personal computer, accordingly, the data transmission state can be visually recognized by the user by graphical or numerical (expressing the data quantity) display on the screen.

However, such graphical or numerical display is not easy to understand, and it may be considered to display together with the time or characters, but when the display is complicated, the user may be confused.

Hitherto, the data reception state is indicated by such graphical display, but in other case E-mail or data is transmitted. In graphical display, however, there is no means for distinguishing whether data is transmitted or received.

On the other hand, the personal computer is for personal use, while the television is mostly seen by the family, rather than personal use, and the users rarely watch the television receiver at a short distance. It is hence desired that the display can be confirmed from a long distance.

BRIEF SUMMARY OF THE INVENTION

The invention is devised in the light of the above problems, and it is hence an object thereof to present an Internet information displaying apparatus allowing to recognize the connection state of the communication line easily on the screen of the receiver, if the video signal is being displayed, in the Internet information displaying apparatus comprising both Internet receiving function, and display function of video signals, for example, television broadcast signals, and video signals reproduced from video cassette, digital video disk, etc.

It is also an object of the invention to present an Internet information displaying apparatus preventing waste of telephone charge by forgetting the connection of communication line with the Internet.

It is other object of the invention to present an Internet information displaying apparatus capable of displaying the Internet information on the entire display screen automatically when the television program is terminated while displaying the television program and Internet information simultaneously.

It is a different object of the invention to present a screen displaying method and Internet information displaying apparatus easy to operate and easy to see on the display screen, in the browser screen for showing Internet information in a television receiver.

It is a further different object of the invention to present an Internet information displaying apparatus for displaying the communication state of received data from a provider or transmitted data to a provider graphically in a same display area, and further displaying characters, connection time and others, so that transmission or reception of data can be distinguished at a glance.

The Internet information displaying apparatus of the invention basically comprises: video signal inputting means for inputting a video signal; picture signal outputting means for extracting a first picture signal from the video signal inputted to the video signal inputting means, and outputting it; sound signal outputting means for extracting a sound signal from the video signal inputted to the video signal inputting means, and outputting it; a speaker which generates sound from the sound signal outputted from the sound signal outputting means; digital data transmitting and receiving means for transmitting and receiving digital data from a communication line; Internet connecting means for transmitting the digital data to the digital data transmitting and receiving means, and receiving the digital data from the digital data transmitting and receiving means; data converting means for converting the digital data received by the Internet connecting means as a second picture signal, and outputting it; displaying means for displaying the first picture signal outputted from the picture signal outputting means and/or the second picture signal outputted from the data converting means on the screen; and character signal generating means for generating a character signal and displaying it on the screen of the displaying means.

In such constitution, a first aspect of the Internet information displaying apparatus of the invention further comprises character signal generation controlling means for detecting the state of transmission and reception of digital data of the digital data transmitting and receiving means, and controlling the character signal generating means so as to generate a character signal to indicate the transmission or reception state.

As a result, the state of transmission or reception of the digital data of the digital data transmitting and receiving means, in other words, the state of connection to the provider is displayed on the screen.

A second aspect of the Internet information displaying apparatus of the invention relates to the first aspect, in which the display of transmission or reception state by the character signal generation controlling means is executed when the displaying means displays the first picture signal, for example, television broadcast, or reproduction signal of recording medium such as video cassette and digital disk.

Therefore, for example, in the state of displaying television broadcast, or reproduction signal of recording medium such as video cassette and digital disk, the connection state to the provider is displayed on the screen.

A third aspect of the Internet information displaying apparatus of the invention relates to the second and third aspects, in which the display of transmission or reception state by the character signal generation controlling means is executed, then the second picture signal outputted from the data converting means is automatically displayed on the displaying means.

Therefore, for example, in the state of displaying television broadcast, or reproduction signal of recording medium such as video cassette and digital disk, when the connection to the provider is complete, the Internet information is displayed automatically.

A fourth aspect of the invention relates to an Internet information displaying apparatus comprising first clocking means for clocking the time from connection of the Internet connecting means with the communication line; and clocking result information generating means for displaying the information relating to the clocking result by the first clocking means on the screen of the displaying means.

Accordingly, the user does not forget that the communication line is connected to the Internet, and the telephone charge is not spent purposelessly.

A fifth aspect of the Internet information displaying apparatus of the invention relates to the fourth aspect, in which the connection of the communication line and the Internet connecting means is cut off when operation relating to the Internet is not done until the first clocking means clocks a predetermined time.

Accordingly, the user does not forget that the communication line is connected to the Internet, and the telephone charge is not spent purposelessly.

A sixth aspect of the Internet information displaying apparatus of the invention relates to the fourth or forth aspect, further comprising second clocking means for starting clocking every time operation relating to the Internet is done, in which the connection of the communication line and the Internet connecting means is cut off when operation relating to the Internet is not done until the second clocking means clocks a predetermined time.

Accordingly, the user does not forget that the communication line is connected to the Internet, and the telephone charge is not spent purposelessly.

A seventh aspect of the Internet information displaying apparatus of the invention relates to the fifth or sixth aspect, in which notice of disconnection of the communication line is displayed on the screen for a predetermined time before cutting off the connection of the Internet connecting means with the communication line.

Accordingly, the user does not forget that the communication line is connected to the Internet, and the telephone charge is not spent purposelessly.

An eighth aspect of the Internet information displaying apparatus of the invention, in basic constitution, further comprises composing means for compressing the first picture signal and second picture signal in the horizontal direction of the screen of the displaying means in synchronism with the synchronizing signal in the video signal, composing laterally, and displaying on the screen of the displaying means; and detecting means for detecting presence or absence of the synchronizing signal while the composing means is composing laterally and displaying on the screen the first picture signal and second picture signal; in which the displaying means displays the second picture signal on the entire screen of the displaying means while the detecting means is not detecting the synchronizing signal.

Accordingly, while the television program and the Internet information are displayed simultaneously, when the television program is terminated, the Internet information is automatically displayed in the entire screen of the displaying means.

A ninth aspect of the Internet information displaying apparatus of the invention relates to the eighth aspect, in which it is displayed on the screen that the video signal is not received when the displaying means displays the second picture signal on the entire screen.

Accordingly, while the television program and the Internet information are displayed simultaneously, when the television program is terminated, the Internet information is automatically displayed in the entire screen of the displaying means, so that it may be noticed to the user.

A tenth aspect of the Internet information displaying apparatus of the invention, in basic constitution, further comprises screen displaying means for displaying a tool bar composed of plural buttons each representing control function on the screen of the displaying means, and the image displaying means has means for magnifying and displaying a selected button when an arbitrary button in the tool bar is selected.

Accordingly, the selected button is magnified and displayed, so that it is recognized easily.

A eleventh aspect of the Internet information displaying apparatus of the invention relates to the tenth aspect, in which the displaying state of the selected button is magnified in the direction toward the center of the screen.

Therefore, when the tool bar is positioned, for example, in the upper part of the screen, the button is magnified and displayed in the lower direction of the screen.

A twelfth aspect of the Internet information displaying apparatus of the invention relates to the tenth aspect, in which characters expressing the function of the button are also displayed when magnifying and displaying the selected button.

Therefore, as compared with the case of display by magnifying only, the function can be recognized more easily.

An thirteenth aspect of the Internet information displaying apparatus of the invention relates to the tenth aspect, in which the image displaying means further has means for varying the displaying state of the button when it is designated to execute the function of the selected, magnified and displayed button.

Accordingly, the displaying state of the button specified to execute the function is varied, so that it is recognized easily.

A fourteenth aspect of the Internet information displaying apparatus of the invention relates to the thirteenth aspect, in which the displaying state of the selected button when executing the function is displayed in a depressed state from the screen.

Accordingly, it is easy to recognize which button is functioning.

In basic constitution of a fifteenth aspect of the Internet information displaying apparatus of the invention, the character generation controlling means generates at least a bar increasing depending on the quantity of transmitted and received data, the characters showing connection time of the communication line, and characters showing the communication state, and displays in part of the screen of the displaying means.

Accordingly, an approximate time required for remaining transmission or reception from the transmitted or received quantity of data, an approximate charge from the connection time of the communication line, and the communication state are known.

A sixteenth aspect of the Internet information displaying apparatus of the invention relates to the fifteenth aspect, in which the bar generated by the character generation controlling means differ in color depending on the type of data.

It is therefore easy to judge whether character data is communicated or text data is communicated.

A seventeenth aspect of the Internet information displaying apparatus of the invention relates to the fifteenth aspect, in which the bar generated by the character generation controlling means differ in color depending on the state of communication.

It is therefore easy to judge whether in transmission or in reception.

A eighth aspect of the Internet information displaying apparatus of the invention relates to the sixteenth or seventeenth aspect, in which the connection time of the communication line, and the characters showing the state of communication are displayed as being superposed on the characters by the bars generated by the character generation controlling means.

Therefore, since the connection time of the communication line and communication state are displayed also by characters, it is easier to recognize them.

A nineteenth aspect of the Internet information displaying apparatus of the invention relates to the eighteenth aspect, in which the characters showing the connection time of the communication line and the characters showing the state of communication are displayed alternately at predetermined time interval.

Therefore, since the characters showing the connection time of the communication line and the communication state are displayed in relatively large characters, it is easy to recognize.

A first aspect of the Internet information displaying method of the invention is a method for receiving Internet information, displaying it on the screen, and displaying a tool bar composed of plural buttons each representing control function on the screen, comprising a step of selecting an arbitrary button in the tool bar; and a step of magnifying and displaying the selected button; and a step of magnifying and displaying the selected button.

Accordingly, the selected button is magnified and displayed, so that it is recognized easily.

A second aspect of the Internet information displaying method of the invention, at the step of magnifying and displaying the selected button in the first aspect, the magnified display of the button is shown in the direction toward the center of the screen.

Therefore, when the tool bar is positioned, for example, in the upper part of the screen, the button is magnified and displayed in the lower direction of the screen.

A third aspect of the Internet information displaying method of the invention, at the step of magnifying and displaying the selected button in the first aspect, characters for expressing the function of the button are also displayed at the step of magnifying and displaying the selected button.

Therefore, as compared with the case of display by magnifying only, the function can be recognized more easily.

A fourth aspect of the Internet information displaying method of the invention, in the first aspect, further comprises a step of varying the display mode of the magnified and displayed button when executing the function of the selected button.

Accordingly, the displaying state of the button specified to execute the function is changed, so that it is recognized easily.

A fifth aspect of the Internet information displaying method of the invention, when executing the function of the selected button in the fourth aspect, the selected button is displayed in a depressed state from the screen at the step of varying the displaying state of the magnified and displayed button.

Accordingly, it is easy to recognize which button is functioning.

The above and further objects and features of the invention will more fully be apparent from the following detailed description with accompanying drawings.

BRIEF DESCRIPTION OF THE SEVERAL VIEWS OF THE DRAWINGS

FIG. 36 is an explanatory diagram of a character palette.

DESCRIPTION OF THE PREFERRED EMBODIMENTS

Figure 1:
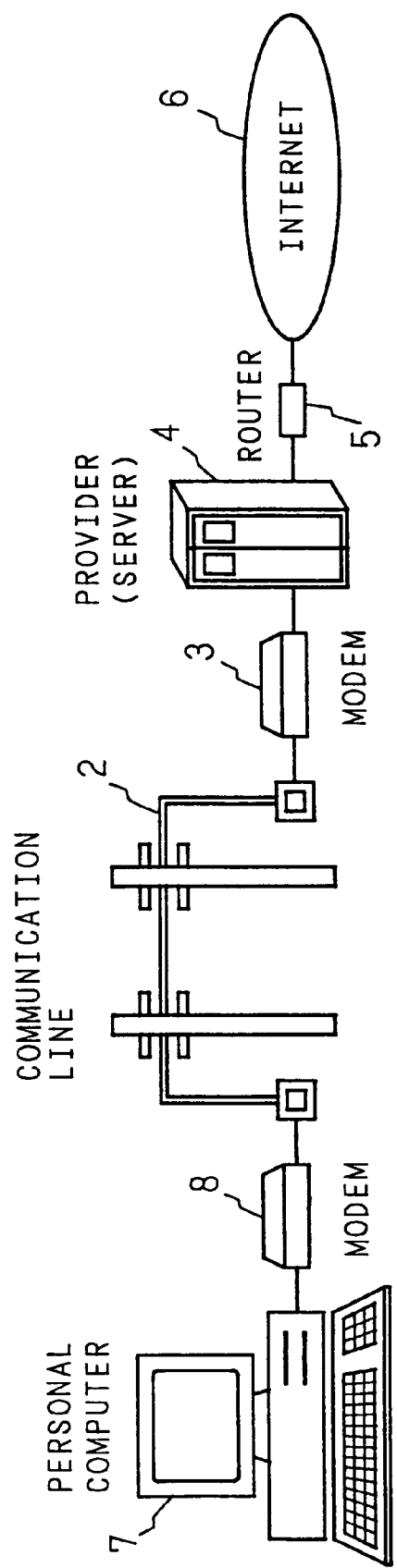
FIG. 1 is a schematic diagram showing a conventional connection example of computer and Internet.

Referring now to the drawings, preferred embodiments of the invention are described below.

Figure 2:
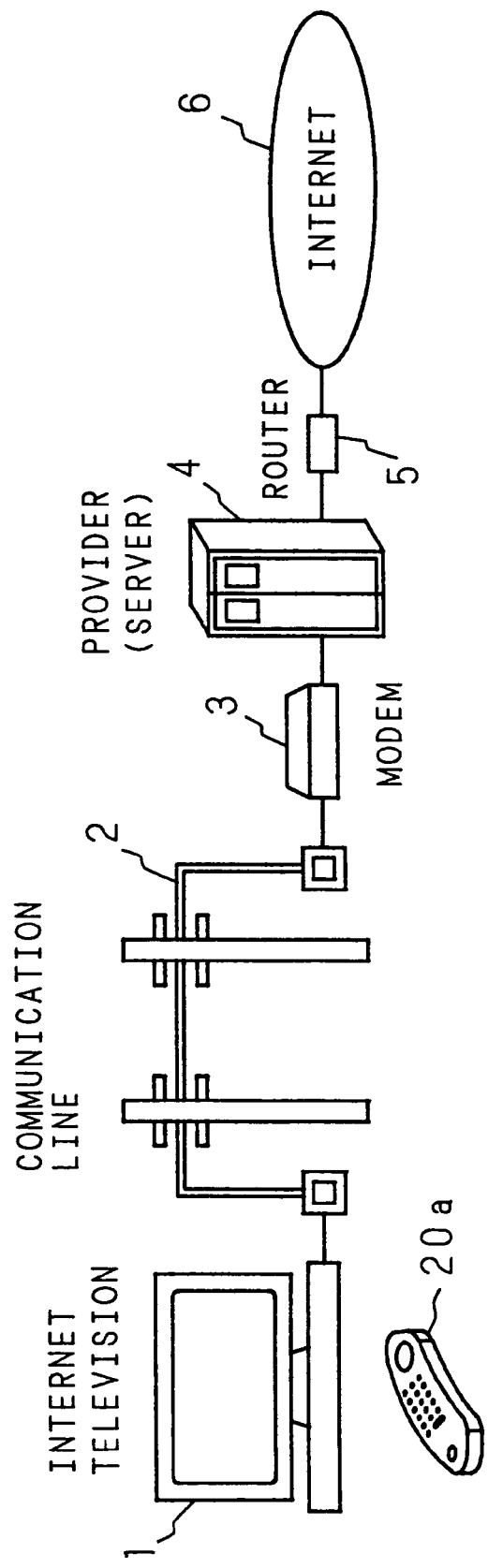
FIG. 2 is a schematic diagram showing a connection example of Internet information displaying apparatus of the invention and Internet.

FIG. 2 is a schematic diagram showing a connection example of an Internet television as an embodiment of an Internet information displaying apparatus of the invention and the Internet. In this connection example, an Internet television 1 remote controlled by a remote controller 20*a* is connected to a communication line 2. A modem is built in the Internet television 1. The communication line 2 is connected to a modem 3 or terminal adapter of a provider as a connection service firm, and the modem 3 is connected to a server 4 which is the provider's computer.

The server 4 is connected to the Internet 6 around the clock, and is connected to the Internet 6 through a router 6 for setting the trunk route.

From the Internet television 1, when the remote controller 20*a* is operated, the telephone is called automatically to connect to the Internet 6 through the server 4 of the provider (dial-up connection).

Figure 3:
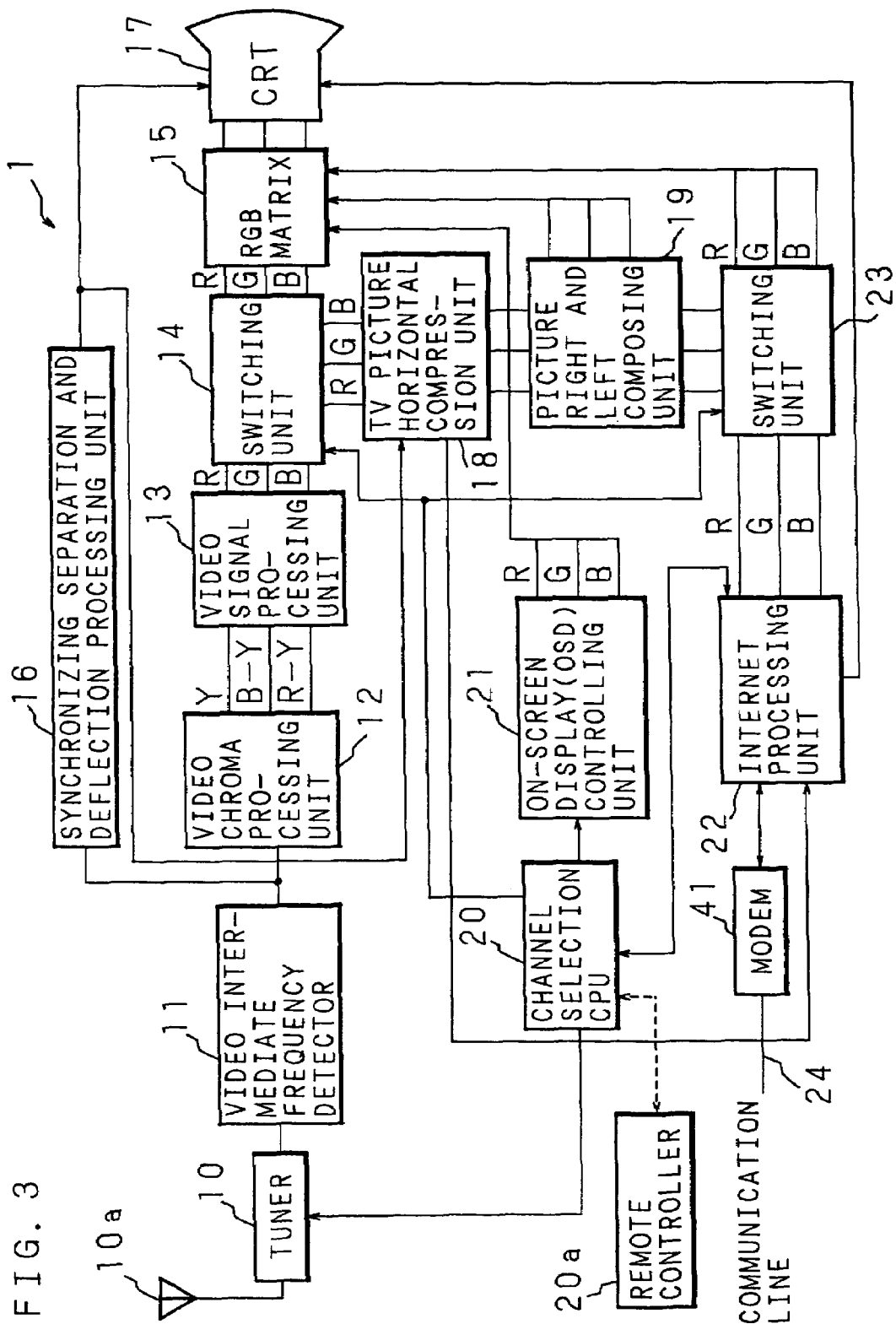
FIG. 3 is a block diagram showing an essential constitution of an embodiment of an Internet information displaying apparatus of the invention.
Figure 6:
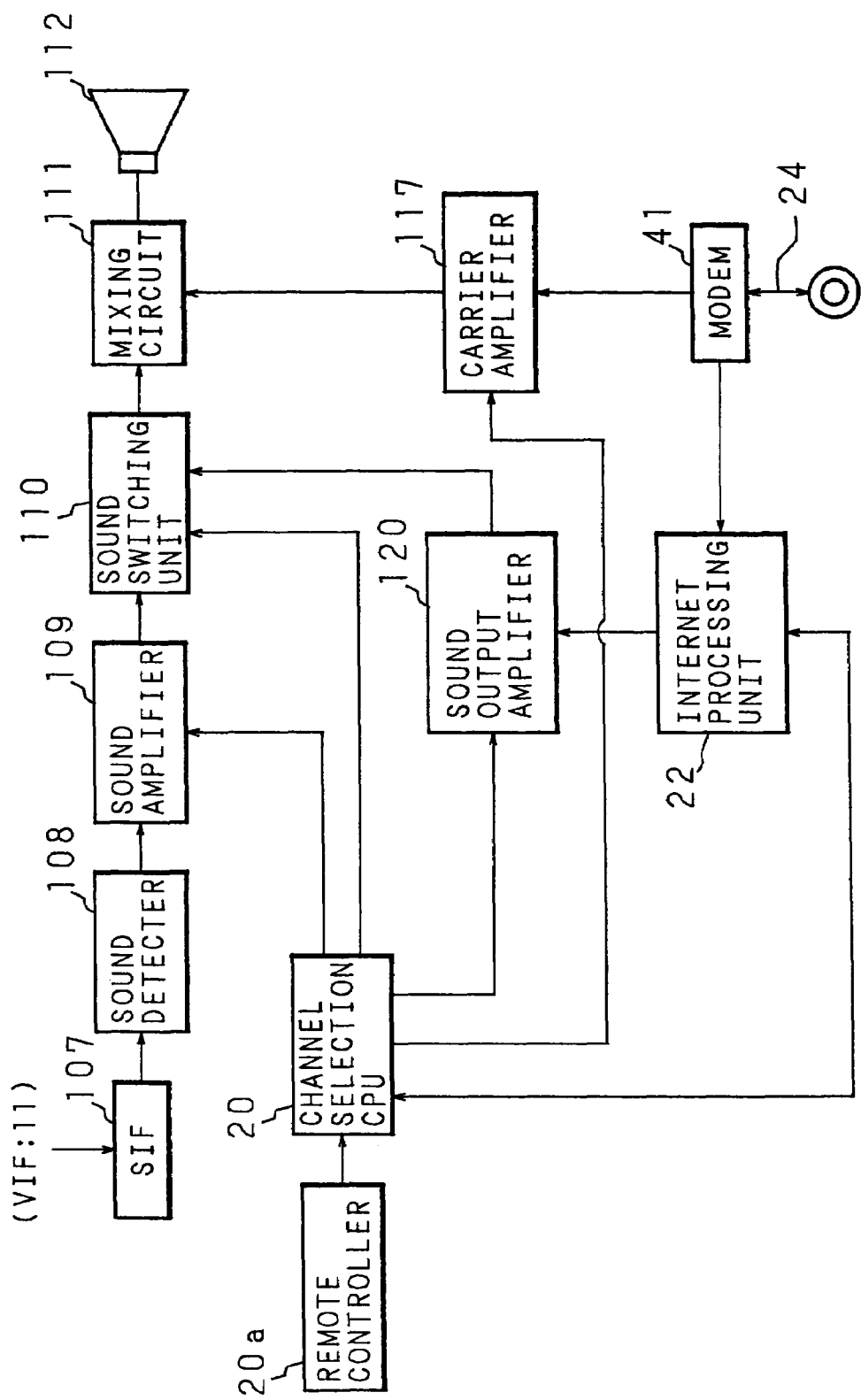
FIG. 6 is a block diagram showing an essential constitution of sound system of an embodiment of an Internet information displaying apparatus of the invention.

FIG. 3 is a block diagram showing an essential constitution of an embodiment of the Internet television as the Internet information displaying apparatus of the invention (the sound system is shown in FIG. 6). In this Internet television 1, the television wave received by an antenna 10*a* is selected by a tuner 10, and the selected television wave is sent into a video intermediate frequency detector 11, in which the video signal is detected. The detected video signal is sent into a video chroma processing unit 12, in which luminance signal Y and color difference signals B-Y, R-Y are extracted.

The extracted luminance signal Y and color difference signals B-Y, R-Y are sent into a video chroma processing unit 13, and converted into red, green and blue color signals R, G, B. These color signals R, G, B are applied to an RGB matrix 15 through a switching unit 14, and outputted to a CRT 17 in each color.

The video signal detected by the video intermediate frequency detector 11 is also given to a synchronizing separation and deflection processing unit 16, and a vertical synchronizing signal and a horizontal synchronizing signal are extracted. The extracted vertical synchronizing signal and horizontal synchronizing signal are given to the CRT 17, and are used as the synchronizing signal for screen scanning.

The color signals R, G, B converted by the video chroma processing unit 13 are also given to a TV picture horizontal compression unit 18 through the switching unit 14. The TV picture horizontal compression unit 18 has a line memory for storing the picture signal of every scanning line, and generates a write clock of 4fsc (fsc=frequency of subcarrier of color) at a multiple frequency of the horizontal synchronizing signal given from the synchronizing separation and deflection processing unit 16, and a picture signal is written in. When reading out the picture signal, a read clock at double frequency 8fsc of the write clock is generated, and is given to a picture right and left composing unit 19.

On the other hand, an Internet processing unit 22 connected to a communication line 24 extracts red, green and blue color signals R, G, B of the picture signal from the data given through the communication line 24, and these color signals R, G, B are given to an RGB matrix 15 through a switching unit 23, and outputted to the CRT 17 in each color. The Internet processing unit 22, when displaying the Internet screen only, generates a vertical synchronizing signal and a horizontal synchronizing signal independently, and these vertical synchronizing signal and horizontal synchronizing signal are given to the CRT 17 and used as the synchronizing signal for screen scanning.

When instructed from the remote controller 20*a*, the Internet processing unit 22 writes in the picture signal by making a direct memory access (DMA) at the timing generated on the basis of the horizontal synchronizing signal and vertical synchronizing signal given from the TV picture horizontal compression unit 18, reads it out by the read clock at frequency of 8fsc locked in line to the horizontal synchronizing signal, and gives it to the picture right and left composing unit 19 through the switching unit 23.

The color signals R, G, B outputted from the Internet processing unit 22 are also given to the picture right and left composing unit 19 through the switching unit 23.

The picture right and left composing unit 19 composes the picture signals given from the TV picture horizontal compression unit 18 and Internet processing unit 22 in the horizontal direction, and the composed video signal is given to the RGB matrix 15, and outputted to the CRT 17 in each color.

The channel selection CPU 20 outputs a channel selection instruction signal to the tuner 10 according to the instruction by the light signal, radio wave signal or the like from the remote controller 20*a*, and exchanges signals with the Internet processing unit 22, thereby operating and controlling the Internet television 1. If necessary, moreover, an instruction signal is also given to an on-screen display (OSD) controlling unit 21, and the picture signal from the OSD controlling unit 21 is given to the RGB matrix 15.

The channel selection CPU 20 also outputs a changeover signal of the mode for displaying the Internet screen in the entire display screen area, and the mode for displaying the television program and Internet screen simultaneously to the switching unites 14 and 23.

Figure 4:
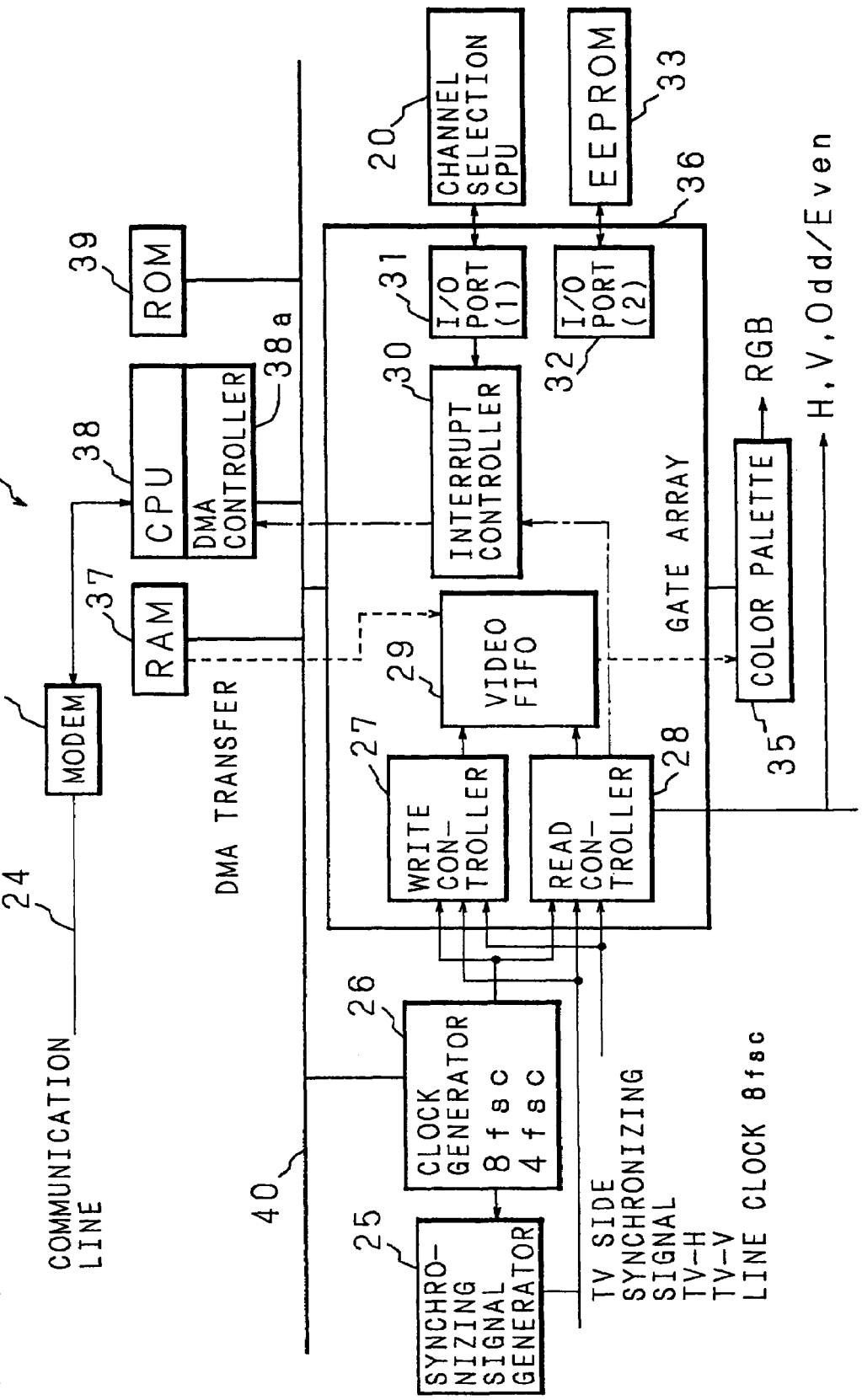
FIG. 4 is a block diagram showing a constitution of Internet processing unit of an Internet information displaying apparatus of the invention.

FIG. 4 is a block diagram showing a constitution of the Internet processing unit 22. In this Internet processing unit 22, a modem 41 connected to the communication line 24 is connected to a CPU 38, and the CPU 38 is connected to a RAM 37, a ROM 39, and a gate array 36 through a bus 40. The CPU 38 incorporates a DMA controller 38a.

The RAM 37 stores picture signal of data obtained through the modem 41 and others, and the ROM 39 stores the processing program of the Internet processing unit 22, picture signal of the original screen (menu screen, etc.) of the Internet television 1, and others.

A synchronizing signal generator 25 generates the original vertical synchronizing signal and horizontal synchronizing signal of the Internet processing unit 22 on the basis of the clock outputted from a clock generator 26, and gives them to the gate array 36. The clock generator 26 generates a clock of 8fsc, and gives it to the gate array 36.

The gate array 36 includes a video FIFO 29 which is a line memory, a write controller 27, and read controller 28. The write controller 27 receives the vertical synchronizing signal and horizontal synchronizing signal from the TV picture horizontal compression unit 18 or synchronizing signal generator 25; and also receives a write clock from the TV picture horizontal compression unit 18 or clock generator 26, and controls the writing of the video FIFO 29. The read controller 28 receives the vertical synchronizing signal and horizontal synchronizing signal from the TV picture horizontal compression unit 18 or synchronizing signal generator 25, and also receives the read clock from the TV picture horizontal compression unit 18 or clock generator 26, and controls the reading of the video FIFO 29.

The gate array 36 further includes an I/O port (1) 31 for exchanging signals with the channel selection CPU 20, an interrupt controller 30 for outputting a signal from this I/O port (1) 31 and vertical synchronizing signal as an interrupt signal of the CPU 38, and an I/O port (2) 32 for exchanging signals with an EEPROM 33 for storing telephone number, ID, password, communication log, etc.

In the case of one-screen display, the synchronizing signal generator 25 outputs whether the next display field is odd or even. In the case of two-screen display, the read controller 28 judges whether the next display field is odd or even from the relation of the given vertical synchronizing signal and horizontal synchronizing signal, and gives the result of judgement to the CPU 38 through the interrupt controller 30 at the interrupt timing of the vertical synchronizing signal.

The color signals R, G, B being read out from the video FIFO 29 are individually tinted finely in a color palette 35, and outputted to the switching unit 23.

Figure 5:
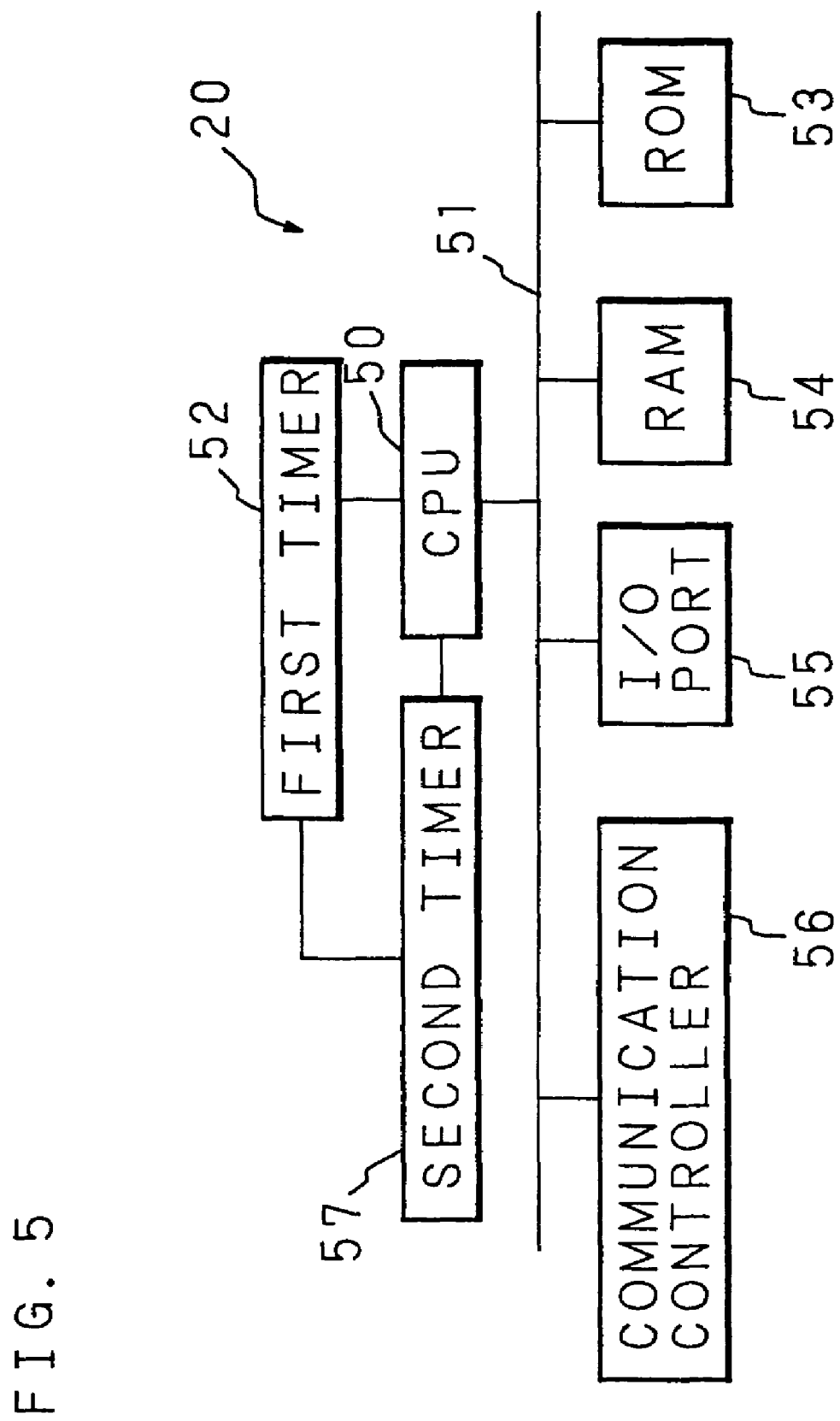
FIG. 5 is a block diagram showing a constitution of channel selection CPU of an Internet information displaying apparatus of the invention.

FIG. 5 is a block diagram showing the constitution of the channel selection CPU 20. In this channel selection CPU 20, a communication controller 56, an I/O port 55, a RAM 54, and a ROM 53 are connected through a bus 51 to a CPU 50 to which a first timer 52 as first clocking means and a second time 57 as second clocking means are connected.

The communication controller 56 communicates with the remote controller 20a. The I/O port 55 is connected individually to the tuner 10, OSD controlling unit 21, Internet processing unit 22, etc.

FIG. 6 is a block diagram showing an essential constitution of sound system of an embodiment of Internet television as the Internet information displaying apparatus of the invention.

Reference numeral 107 is a sound intermediate frequency (SIF) circuit, which detects an SIF signal from the output of the video intermediate frequency detector 11. Reference numeral 108 is a sound detector, which detects a sound signal from the SIF signal, and supplies to a sound amplifier 109. Reference numeral 110 is a sound switching unit for changing over a sound signal outputted from the sound amplifier 109 according to an instruction from the channel selection CPU 20 and a sound signal outputted from a sound output amplifier 120. Reference numeral 111 is a mixing circuit, which mixes the output of the sound switching unit 110 and the output of a carrier amplifier 117, and outputs the result to a speaker 112. The carrier amplifier 117 amplifies the carrier sound from the modem 41. The sound output amplifier 120 outputs the sound signal from the Internet processing unit 22.

Explained below is the operation of the Internet television as the Internet information displaying apparatus of the invention having the above constitution.

In the Internet television 1, while the user watches the television broadcast, the channel selection CPU 20 connects the switching unit 14 to the video chroma processing unit 13, and the video signal is outputted to the CRT 17. At the same time, the channel selection CPU 20 also connects the sound switching unit 110 to the sound amplifier 109, and the sound signal is supplied to the speaker 112 through the mixing circuit 111. The sound signal is changed in the sound volume by controlling the sound amplifier 109. This is realized by controlling the sound amplifier 109 from the channel selection CPU 20 by operation of the remote controller 20a.

When the channel is selected, on the other hand, the channel selection CPU 20 controls the OSD controlling unit 21 so as to generate a character signal for displaying the channel number, and the character signal is supplied from the OSD controlling unit 21 to the RGB matrix 15. This OSD controlling unit 21 can display not only the channel character, but also the sound volume adjustment, various adjustment modes and others.

Figure 7:
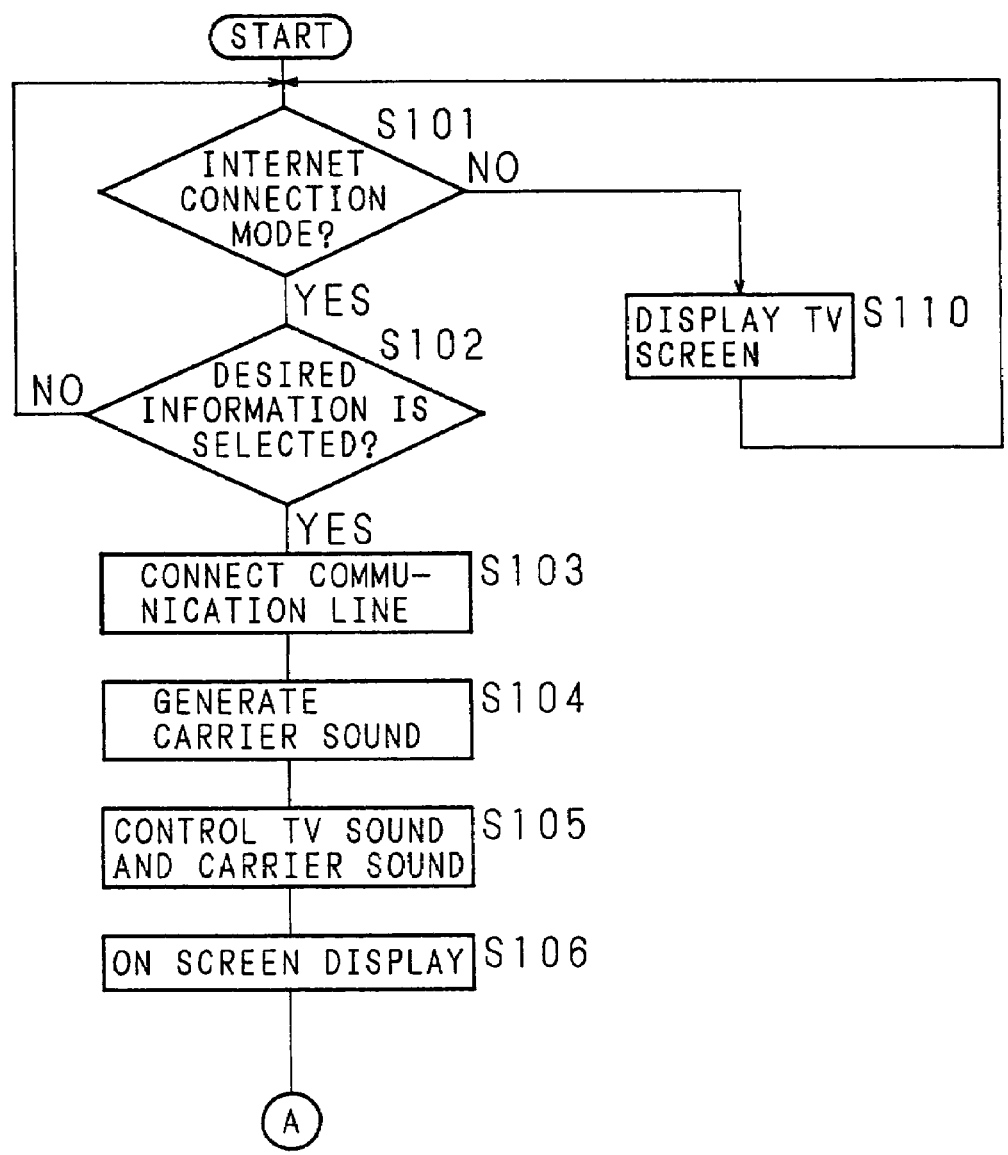
FIG. 7 is a flowchart showing operating procedure for receiving Internet information by an Internet information displaying apparatus of the invention.
Figure 8:
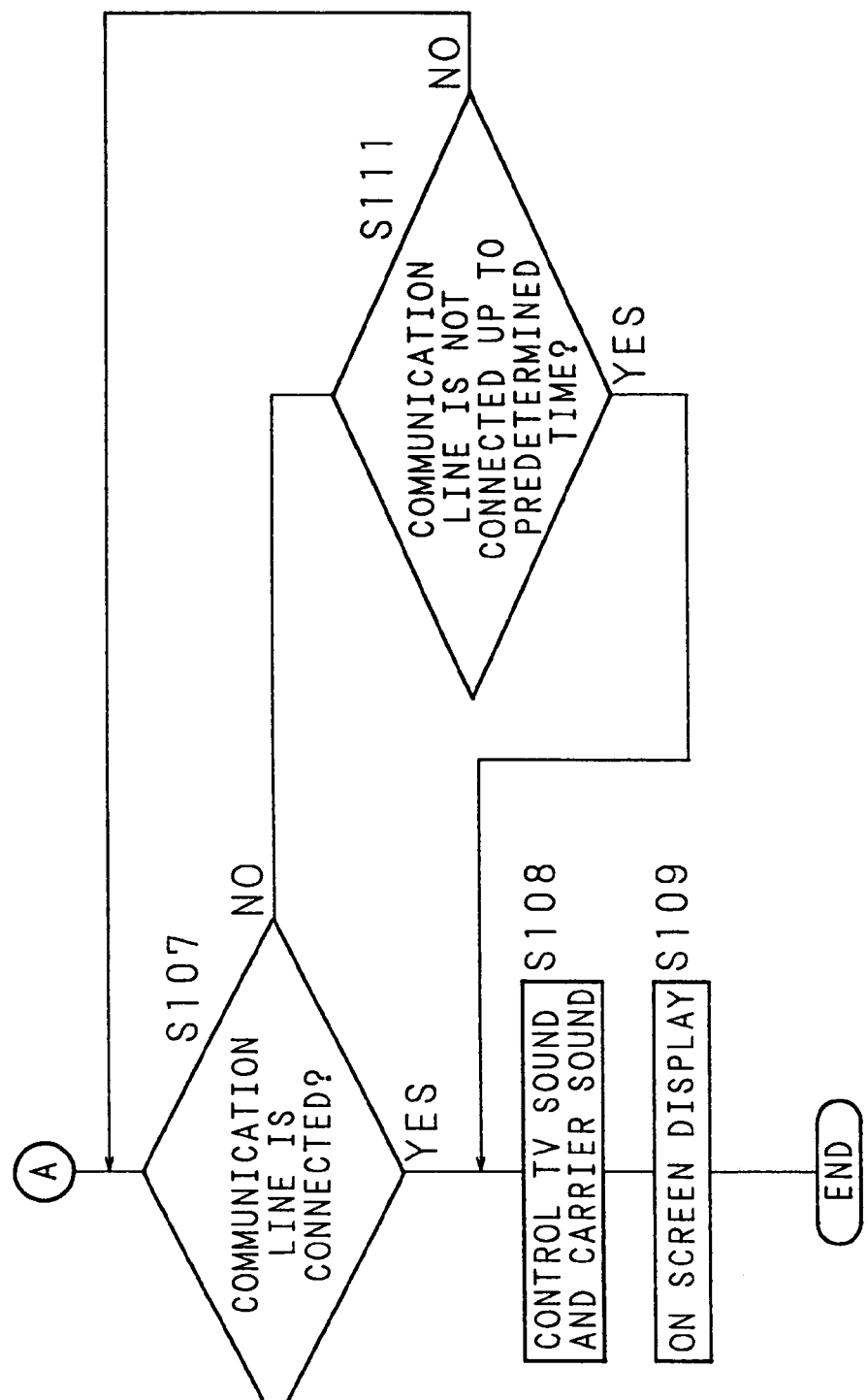
FIG. 8 is a flowchart showing operating procedure for receiving Internet information by an Internet information displaying apparatus of the invention.

When receiving the Internet information, the operation is described below while referring to the flowcharts in FIG. 7 and FIG. 8.

Figure 9:
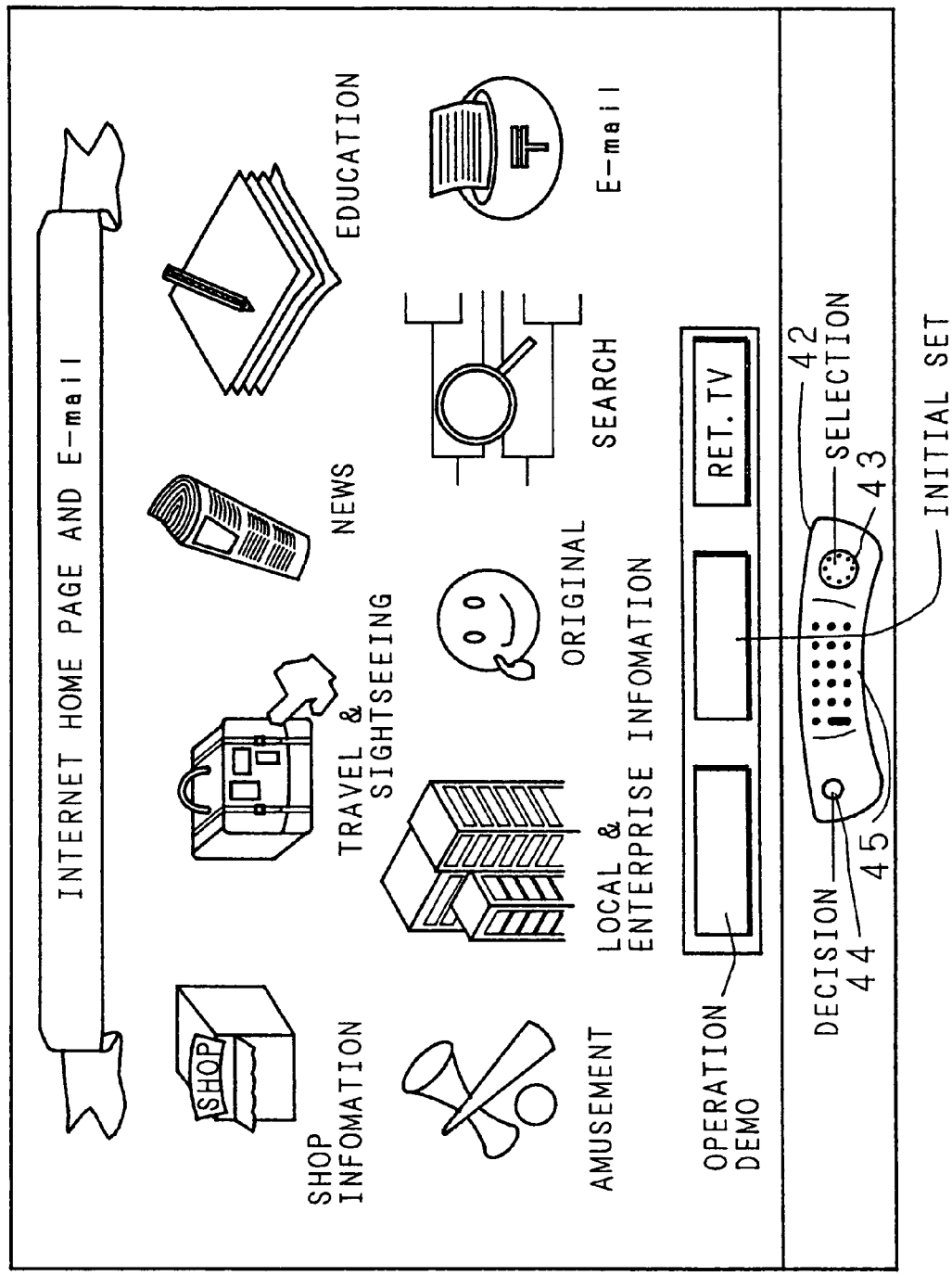
FIG. 9 is a schematic diagram showing a menu screen displayed by an Internet information displaying apparatus of the invention.

At first, when the Internet connection mode is selected (S101) by the remote controller 20a, the channel selection CPU 20 changes from the television broadcast receiving screen to the Internet menu screen, and controls the OSD controlling unit 21 so as to display the menu screen as shown in FIG. 9. This menu screen is roughly classified in information (shop information, travel and sightseeing, news, education, amusement, local and enterprise information, original, search, E-mail).

In the bottom of the screen, an icon 42 showing the appearance of the remote controller 20a is displayed, and the function of each key is shown. That is, a selection button 43 is displayed at the right end, a decision button 44 at the left end, and various operation buttons 45 in the middle. The selection button 43 can move the "index" pointer or cursor position freely in eight directions, and the picture (including the button shape) or item displayed in character string overlapping with the pointer or cursor when the decision button 44 is operated is selected and determined.

Figure 10:
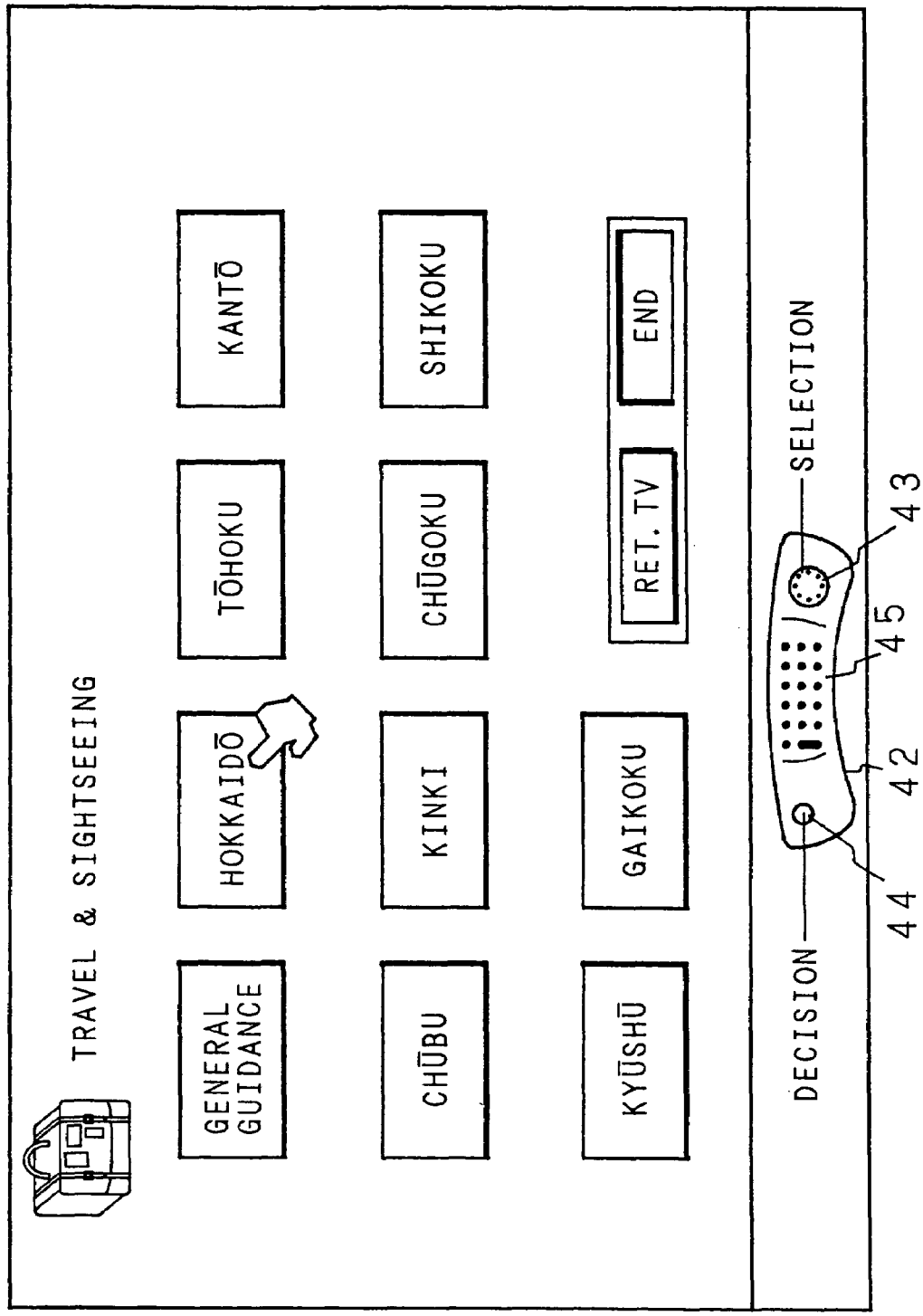
FIG. 10 is a schematic diagram showing a menu screen in a lower layer displayed by an Internet information displaying apparatus of the invention.

When desired information is selected in this menu screen, a lower layer menu screen is displayed. For example, when travel and sightseeing is selected in the menu screen in FIG. 9, a selection menu screen of local regions is displayed as shown in FIG. 10. When desired information is selected, the communication line 24 is connected to the provider which presents the information. At this time, the user can freely change over the television broadcast screen. Or, the screen may be automatically changed over to the television broadcast screen.

In such menu screen, further, when desired information is selected by the remote controller 20*a* (S102), the channel selection CPU 20 transfers the data to the Internet processing unit 22. The Internet processing unit 22 causes the modem 41 to connect the communication line 24 to the provider (S103). If not in Internet connection mode, the screen remains in reception of the television broadcast (S110).

When the modem 41 connects the communication line 24 (making a telephone call to the provider), carrier sound is generated from the modem 41 (S104). At the same time, the notice of start of connection of the communication line 24 is transmitted from the modem 41 to the Internet processing unit 22, and this information is also supplied into the channel selection CPU 20. Receiving it, the channel selection CPU 20 controls to lower the sound volume of the sound amplifier 9 for amplifying the sound signal of television broadcast to a predetermined level, and the sound signal and the carrier sound from the modem 41 are mixed in the mixing circuit 111, and outputted to the speaker 112 (S105). As a result, when the user watches the television broadcast, the sound volume is lowered automatically, and the user can hear the carrier sound of the modem 41.

Figure 11:
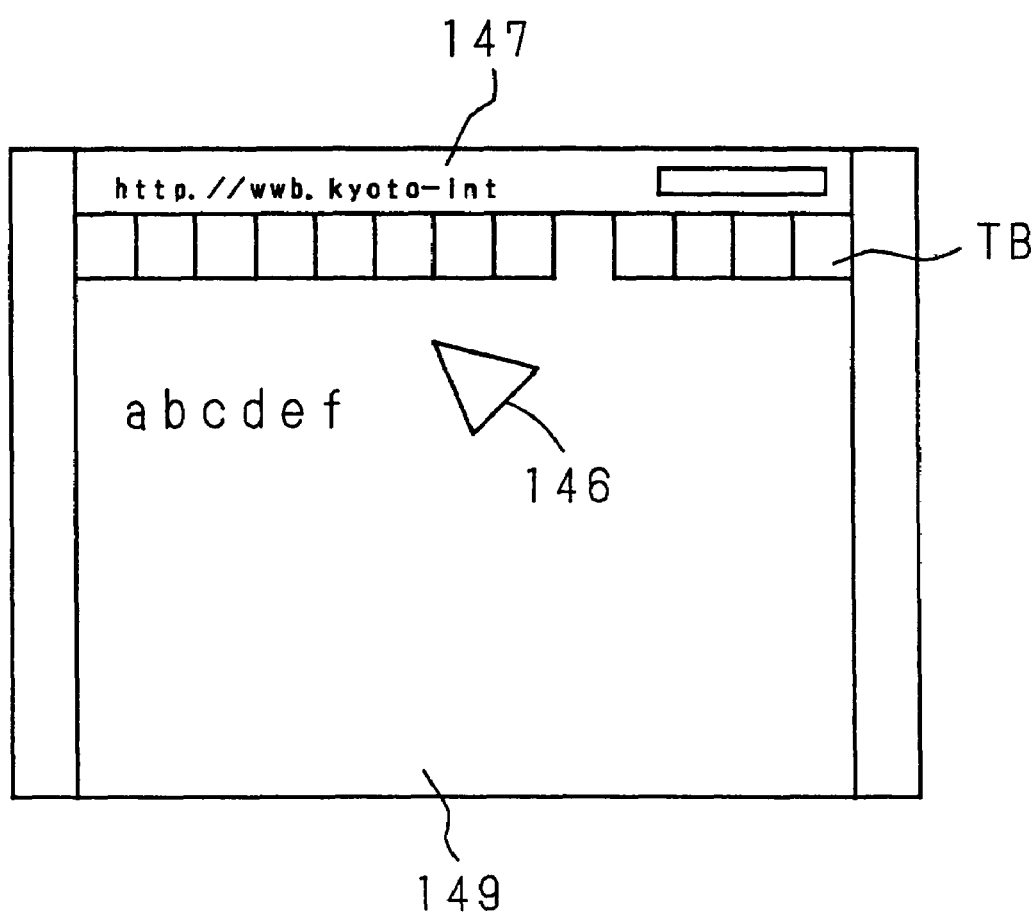
FIG. 11 is a schematic diagram showing a screen display example of an Internet information displaying apparatus of the invention.

At this time, when the user maintains the screen for receiving Internet information without watching the television broadcast, as shown in FIG. 11, a comment (including tool bar TB, etc.) 147 is displayed in the top of the screen, and the Internet information is displayed below the comment 147, that is, an Internet receiving screen 149 appears. In this state, various tools can be selected and operated by a cursor 146 appearing on the screen, and the desired information (provider) of the user can be also selected.

Figure 12:
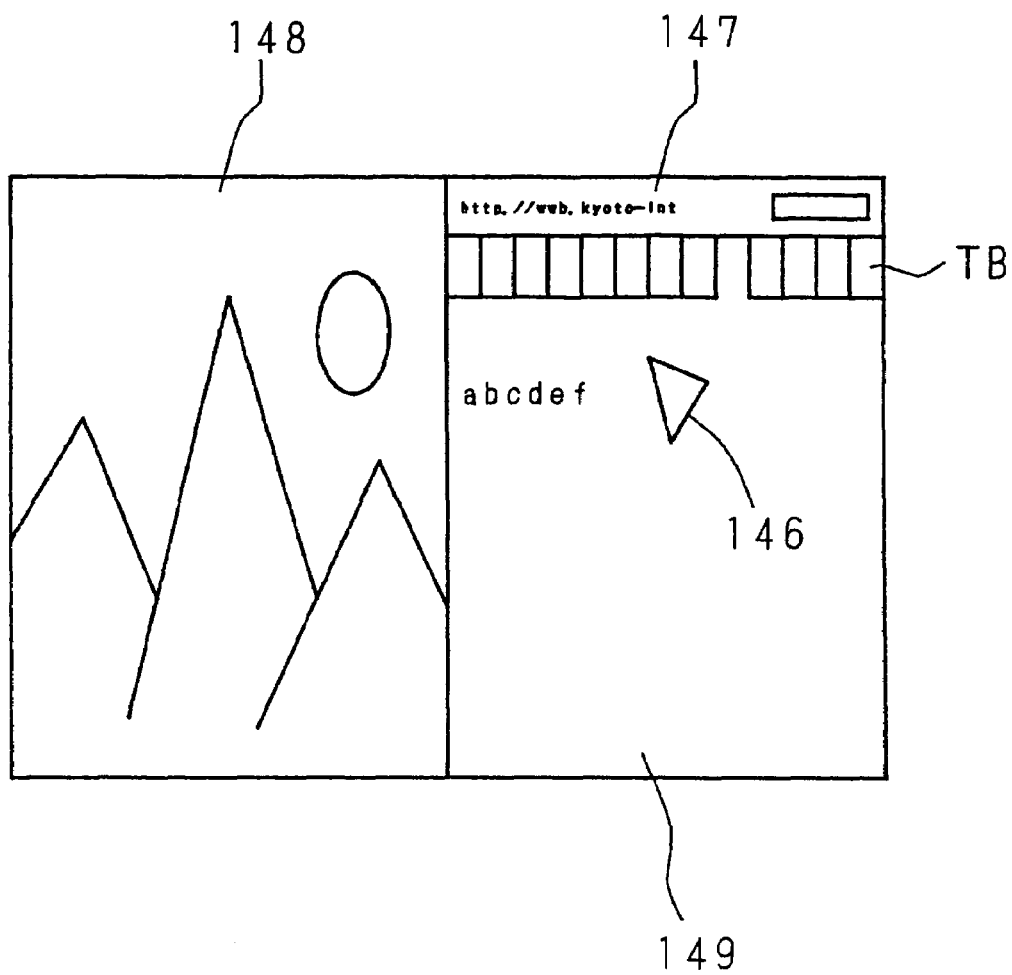
FIG. 12 is a schematic diagram showing a screen display example of an Internet information displaying apparatus of the invention.

Alternatively, the television broadcast and Internet screen can be displayed in the television receiver as shown in FIG. 12. That is, by dividing the screen into two parts, the television broadcast screen 148 can be shown on the left, and the Internet receiving screen 149 on the right.

Figure 13:
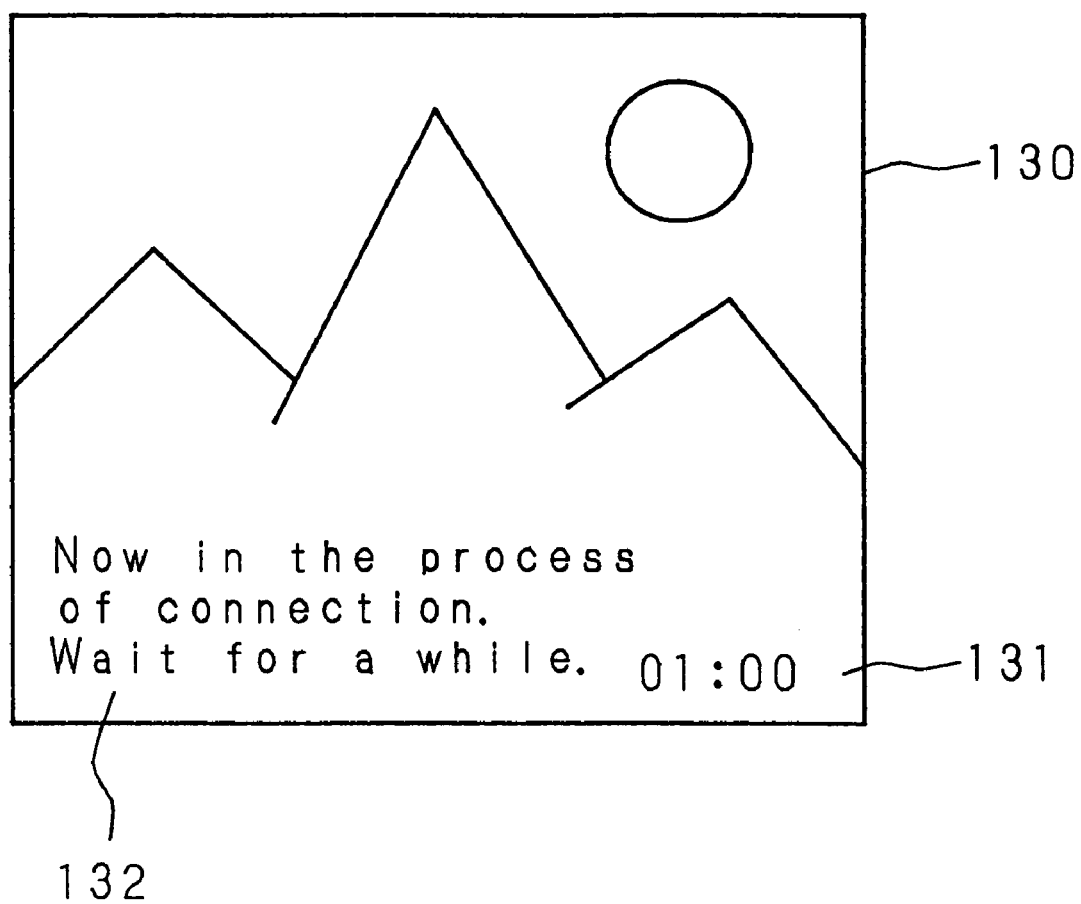
FIG. 13 is a schematic diagram showing a screen display example of an Internet information displaying apparatus of the invention.

On the other hand, after connecting the communication line 24, when the user changes over to the television broadcast screen, the channel selection CPU 20 generates the character signal telling that the communication line 24 is being connected is generated in the OSD controlling unit 21, and it is displayed in the CRT 17 together with the television signal (S106). As an example of this display, a message 132 "Now in the process of connection. Wait for a while" is displayed in the bottom of the screen 30 as shown in FIG. 13. Aside from the message 132, a timer 131 or the like may be displayed to show the connection time. Besides, when adjusting the sound volume, by displaying the bar outputted from the OSD controlling unit 21, the change of the carrier sound and the signal combined with sound signal may be made visible.

When the communication line 24 is connected to the provider, data is received from the modem 41, and the notice of completion of connection is transmitted to the channel selection CPU 20 through the Internet processing unit 22 (S107).

Figure 14:
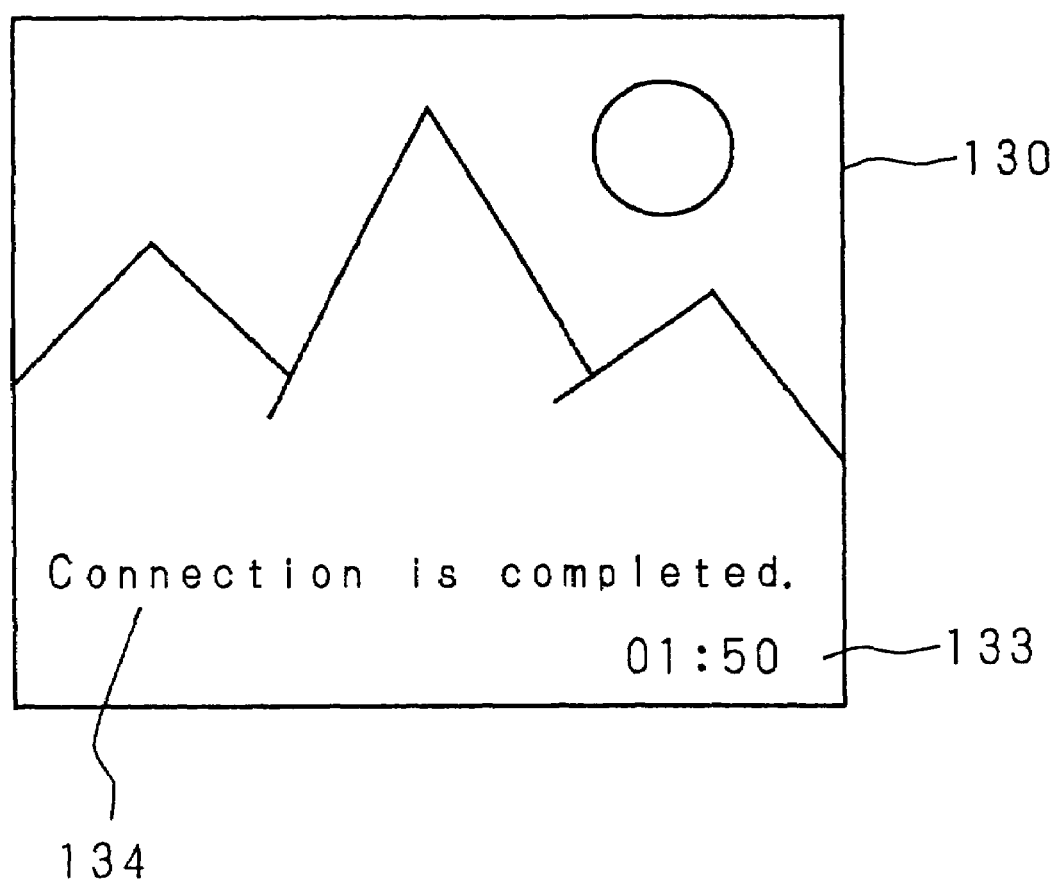
FIG. 14 is a schematic diagram showing a screen display example of an Internet information displaying apparatus of the invention.

Consequently, the channel selection CPU 20 returns the sound volume of the sound signal of television signal to the original level, and the carrier sound is not generated (S108). Moreover, the OSD controlling unit 21 displays a message 134 "Connection is completed" as shown in FIG. 14, together with the connection time by the display of timer 133 (S109).

When connected, receiving data from the modem 41 in the Internet processing unit 22, video signal and sound signal are outputted. The video signal is supplied to the RGB matrix 15 through the switching unit 23, and the sound signal is supplied to the sound switching unit 110 through the sound output amplifier 120.

Figure 15:
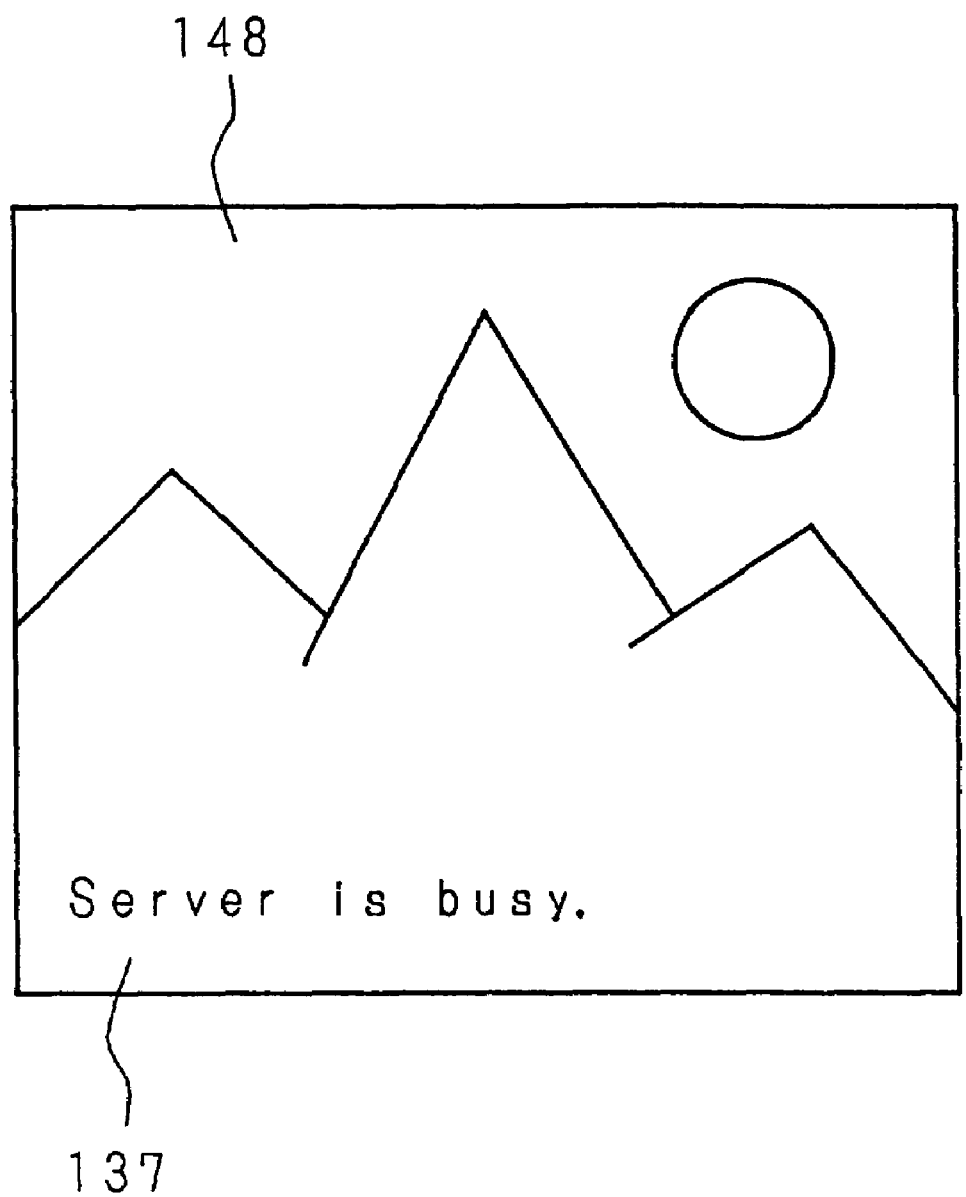
FIG. 15 is a schematic diagram showing a screen display example of an Internet information displaying apparatus of the invention.

Furthermore, even after completion of connection of the communication line 24, if the provider is busy, data is not sent out immediately. In such a case, the channel selection CPU 20 judges that data is not sent out while counting a predetermined time, and a message 137 "Server (or provider) is busy" is displayed as shown in FIG. 15. By reading it, the user can immediately return to the Internet screen, and cut off the line, or connect to other provider. This message 137 may be also indicated as "Busy state".

Figure 16:
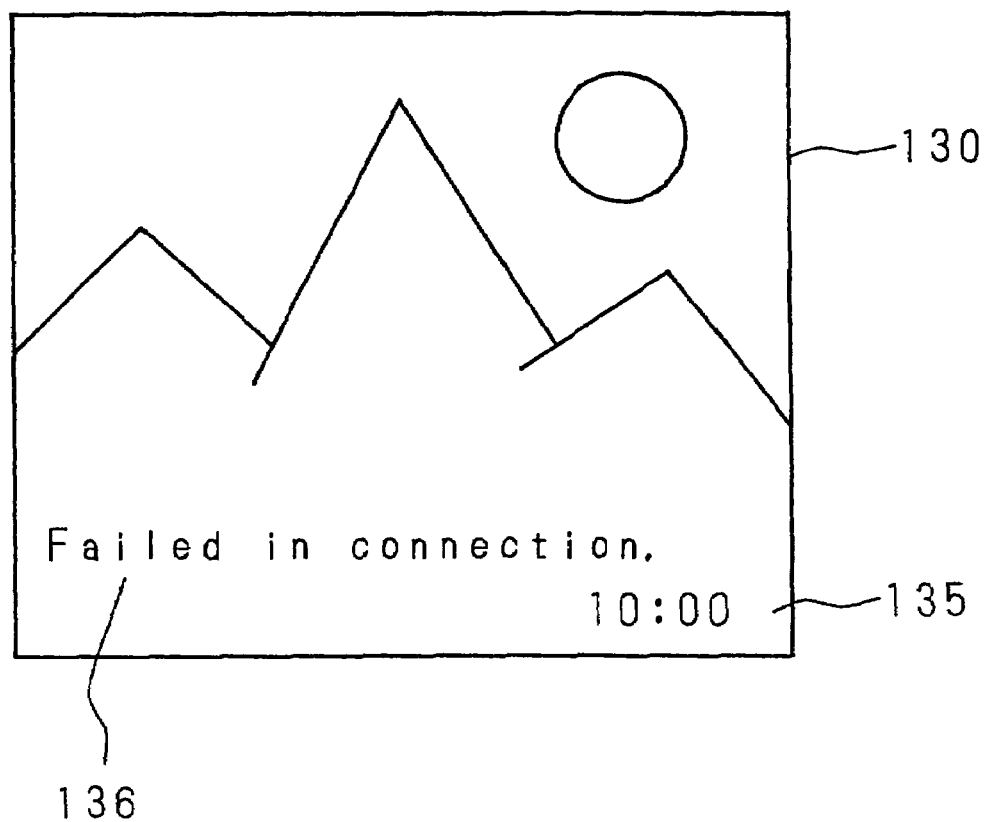
FIG. 16 is a schematic diagram showing a screen display example of an Internet information displaying apparatus of the invention.

When the communication line 24 cannot be connected within a predetermined time (the telephone is not connected) (S111), the channel selection CPU 20 returns the sound volume of the sound signal of the television signal to the original level, and the carrier sound is not outputted (S108). Further, the OSD controlling unit 21 displays a message 136 "Failed in connection" as shown in FIG. 16, together with the display of connection time by the display of timer 135 (S109). Thus, the telephone connection state can be recognized visually.

Incidentally, if falling into the state as shown in FIG. 14, FIG. 15 or FIG. 16, the screen of the television receiver may be returned automatically to the Internet reception screen, or it may be automatically changed to the two-screen display as shown in FIG. 12. Of course, it may be also designed so that the user is free to select the operation for automatically returning to the Internet reception screen or two-screen display.

Figure 21:
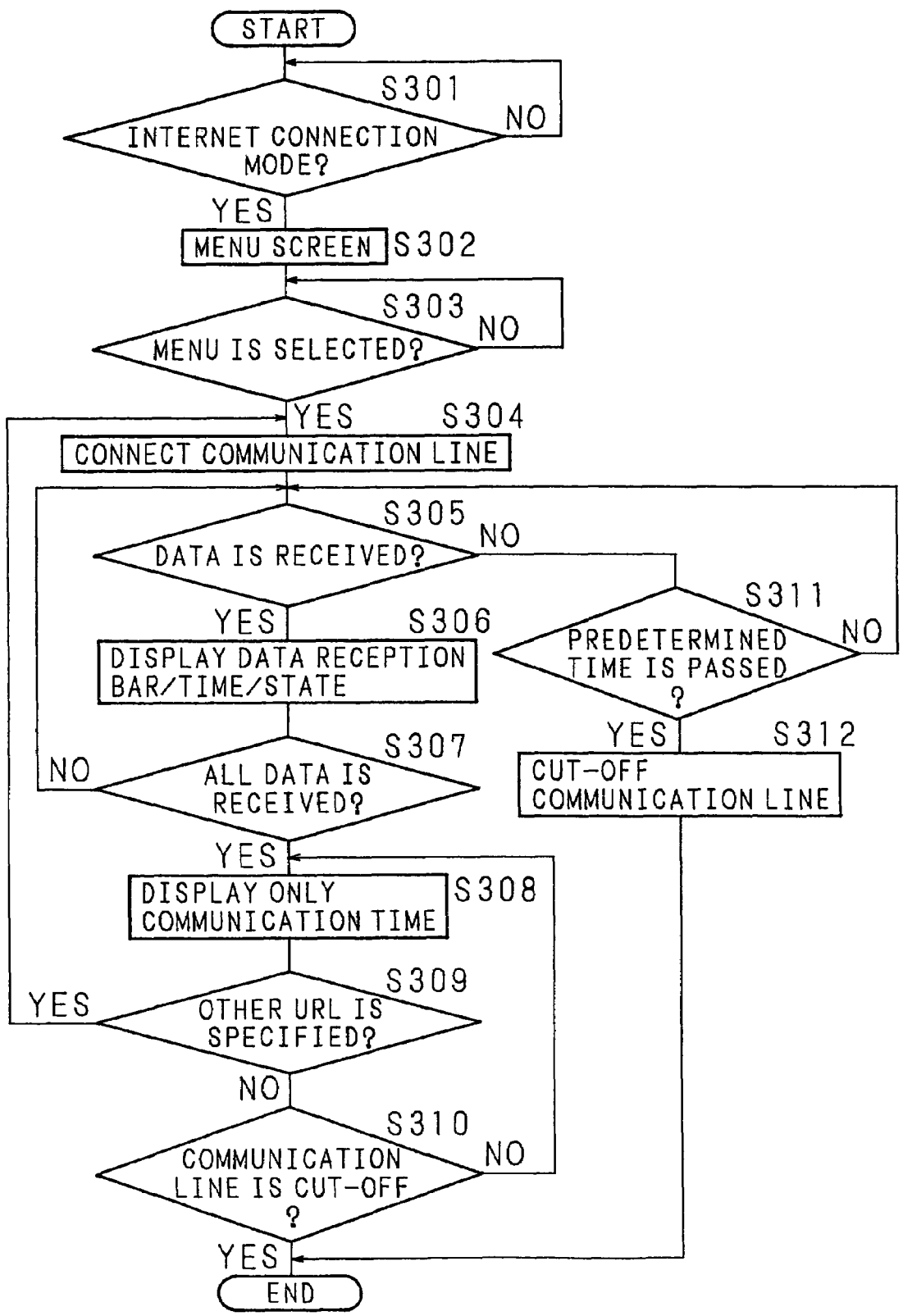
FIG. 21 is a flowchart showing a display procedure of tool bar of an Internet information displaying apparatus of the invention.
Figure 22:
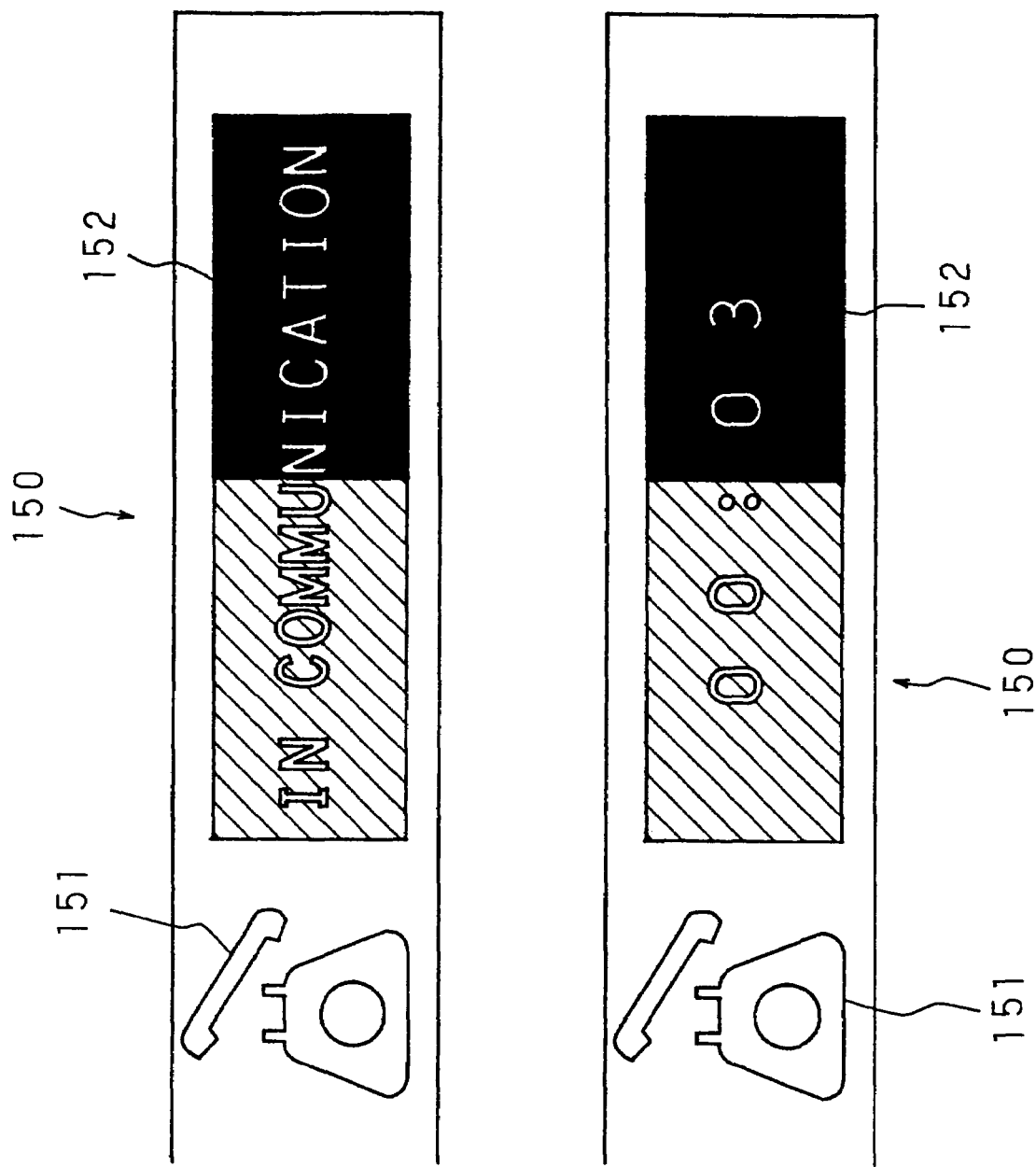
FIG. 22A is a schematic diagram showing a display example of line state displaying unit of an Internet information displaying apparatus of the invention.
FIG. 22B is a schematic diagram showing a display example of line state displaying unit of an Internet information displaying apparatus of the invention.

Display of connection state of the communication line 24 on the Internet reception screen is described below while referring to the schematic diagrams in FIG. 17 through FIG. 20, flowchart in FIG. 21, and schematic diagram in FIG. 22.

Figure 17:
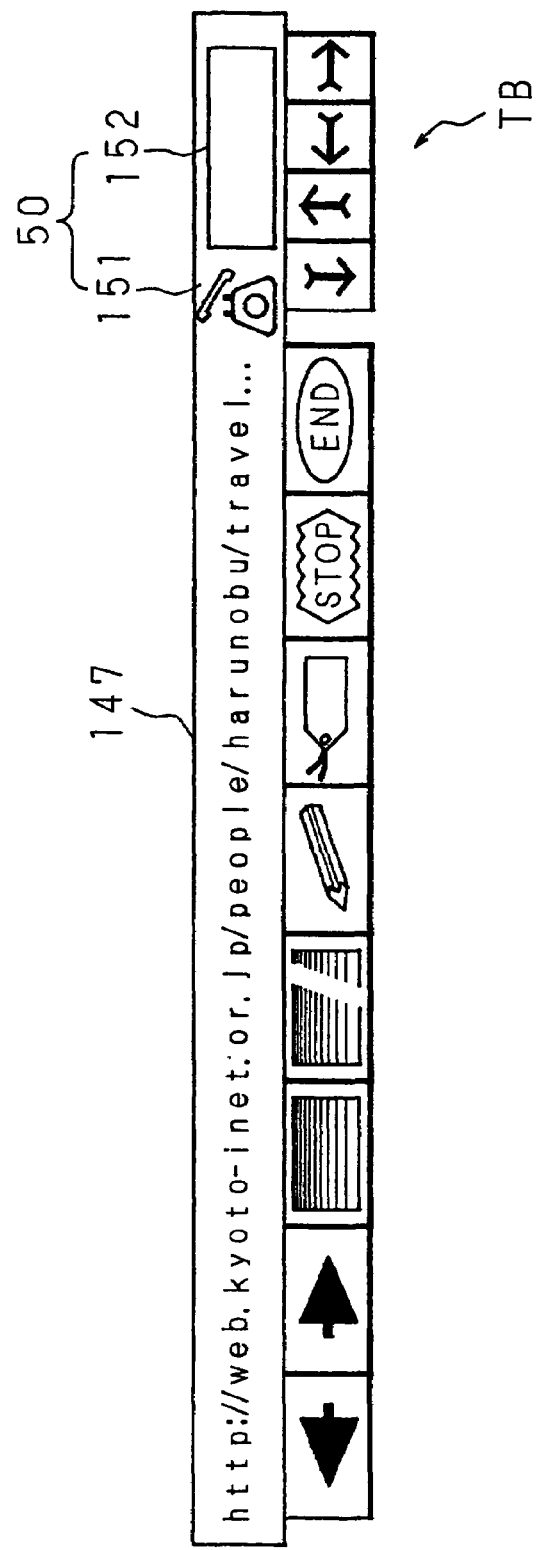
FIG. 17 is a schematic diagram showing a display example of tool bar of an Internet information displaying apparatus of the invention.

At first, in display of menu screen before connection of the communication line 24 in the case of Internet connection mode 24 (S302), as shown in FIG. 11, comment display areas 147 and a tool bar TB are displayed in the top of the screen, and an Internet receiving screen 149 is displayed in the bottom. In the display of comment display areas 147 and tool bar TB, as shown in FIG. 17, a line state display area 150 composed of a telephone mark 151 and a box 152 is shown at the right side of the comment display area 147, and tool bar TB is displayed below. At this moment, the telephone mark 151 is a picture of on-hook state, and the box 152 remains in a white display.

Figure 18:
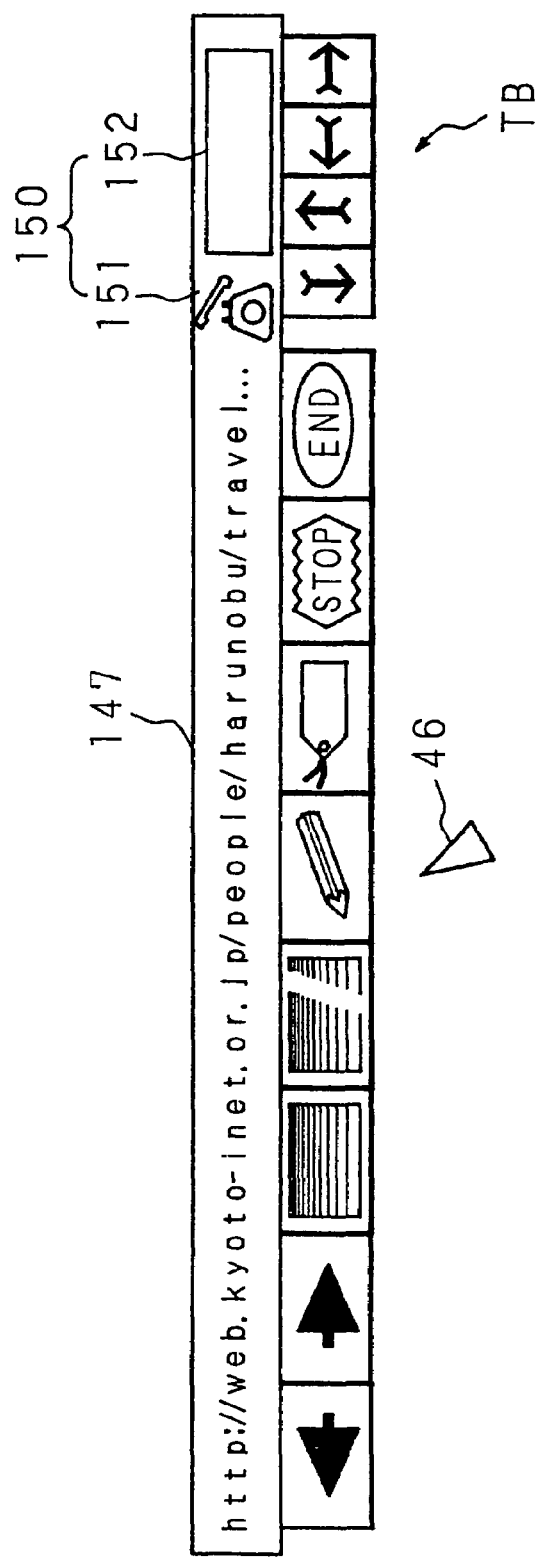
FIG. 18 is a schematic diagram showing a display example of tool bar of an Internet information displaying apparatus of the invention.
Figure 19:
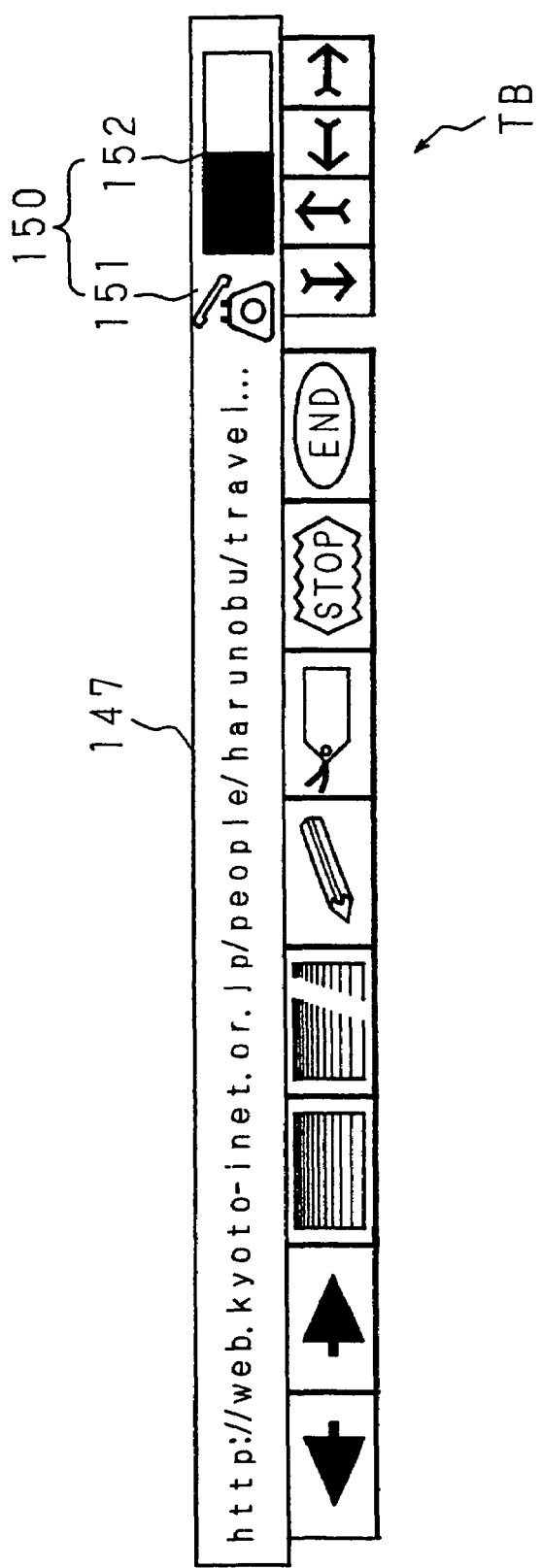
FIG. 19 is a schematic diagram showing a display example of tool bar of an Internet information displaying apparatus of the invention.
Figure 20:
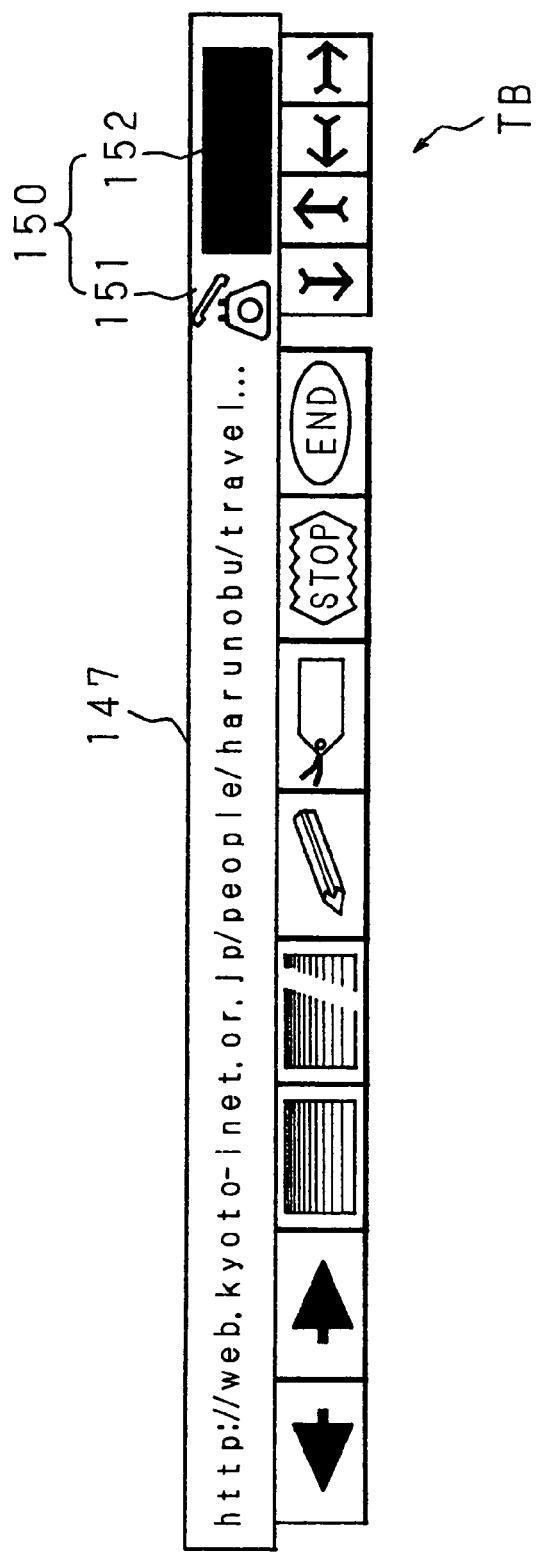
FIG. 20 is a schematic diagram showing a display example of tool bar of an Internet information displaying apparatus of the invention.

In this state, when the communication line 24 is connected (S303, S304) by menu selection, as shown in FIG. 18, the telephone mark 151 is changed to off-hook state.

In this way, when the communication line 24 is connected to the provider, the data sent from the provider is received (S305). In this process of receiving data, how much data is being received at the present at the receiving side is shown in the line state display area 150 as shown in FIG. 22A and FIG. 22B. For example, when the present data receiving quantity is 50%, half of the box 152 of the line state display area 150 is displayed by changing the color of the bar as shown by hatching in FIG. 22A and FIG. 22B, so that it is easily recognized visually.

Moreover, the present line state is indicated by characters (for example, in the "in communication") in the line state display area 150. Or, at every passage of a predetermined time (for example, a short time interval of 5 seconds), the characters may be changed to display of the time of using the communication line (for example, in the case of 3 minutes, "00:03" as shown in FIG. 22B), and the characters and numerals are displayed alternately. Thus, the bar display portion increased in the reception state, and when 100% is received, it may be displayed by characters as "Reception is over" and the display of characters may be erased immediately.

In this way, the present communication state, the communication time, and taking in state of the data can be recognized by seeing only one display area.

Furthermore, in bar display in the box 152, the color is changed by the received data, and the type of data can be recognized. For example, when the data is text data, the bar is displayed in red, and in the case of image data, the bar is displayed in blue. This case is an explanation of reception data, and it is same when transmitting data. That is, when sending an E-mail to the provider side, data is transmitted through the communication line, and the data sending state is indicated by bar display same as mentioned above (characters and time same as when receiving). At this time, in the case of transmission, the bar display is green. Thus, by the color of the bar, transmission or reception can be distinguished. Moreover, when transmitting and receiving E-mail, the bar display may be kept in green color whether in transmission or reception of data, so that the operation mode of communication can be judged by color (mode of E-mail, whether text data or image data from provider).

Consequently, when all data from the provider is received (S307), the line state display area 150 displays only the communication time (S308). When other URL is predetermined, the communication line 24 is connected again, and the same operation is repeated (S309). When the communication line 24 is cut off without specifying URL, the display also stops.

At this moment, clocking of the communication time returns to "0". Besides, in the data receiving state by connecting the communication line 24 (S304, S305), if data is not sent within a predetermined time (S311), the communication line 24 is cut off (S312).

Next is explained the operation of two-screen display of the Internet television 1 as the Internet information displaying apparatus of the invention.

In the Internet television 1, when a mode for operating as an ordinary television is selected by the channel selection CPU 20, the television wave received by the antenna 10a is selected by the tuner 10 by the instruction from the channel selection CPU 20. The selected television wave is sent to the video intermediate frequency detector 11, and a video signal is detected, and from the detected video signal, luminance signal Y and color difference signals B-Y, R-Y are extracted by the video chroma processing unit 12.

The extracted luminance signal Y and color difference signals B-Y, R-Y are sent to a video chroma processing unit 13, and converted into red, green and blue color signals R, G, B. These color signals R, G, B are applied to an RGB matrix 15 through the switching unit 14, and outputted to the CRT 17 in each color.

From the video signal detected by the video intermediate frequency detector 11, a vertical synchronizing signal and a horizontal synchronizing signal are extracted by the synchronizing separation and deflection processing unit 16. The extracted vertical synchronizing signal and horizontal synchronizing signal are given to the CRT 17, and are used as the synchronizing signal for scanning.

In the Internet television 1, when a mode for operating as Internet television is predetermined by the channel selection CPU 20, the CPU 38 is interrupted by the interrupt controller 30. When interrupted, the CPU 38 reads out the picture signal for the portion of one screen of the menu screen from the ROM 39, and sets into the RAM 37. The clock generator 26 outputs a clock, and sends it into the write controller 27 and read controller 28.

The channel selection CPU 20 outputs a changeover signal, and stops the output from the switching unit 14, and changes over the input to the RGB matrix 15 to the data from the switching unit 23 and OSD controlling unit 21 only.

The interrupt controller 30 starts up the DMA controller 38a incorporated in the CPU 38 every time a horizontal synchronizing signal is given from the read controller 28, causes the DMA to read out color signals R, G, B of video signal for the portion of one scanning line from the RAM 37, and gives them to the video FIFO 29. In the video FIFO 29, these color signals R, G, B are written in by the write controller 27 by the write clock of 8fsc, and read out by the timing generated by the read controller 28, and the color signals R, G, B being read out are given to the RGB matrix 15 through the switching unit 23, and are outputted to the CRT 17 in every color.

In the case of one-screen display, the synchronizing signal generator 25 gives the vertical synchronizing signal and horizontal synchronizing signal to the CRT 17, and they are used as the synchronizing signal when scanning the color signals R, G, B on the screen.

Figure 23:
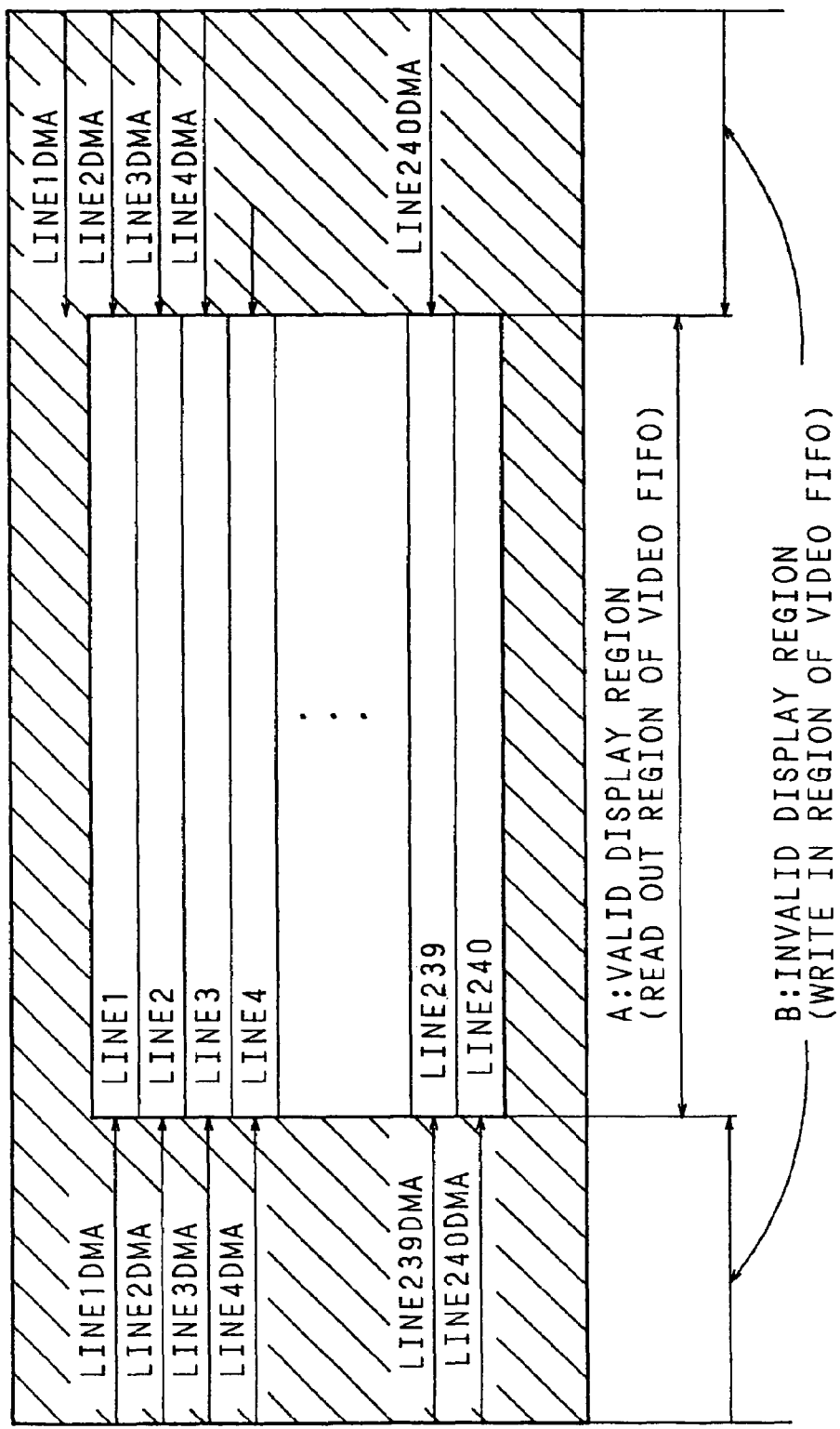
FIG. 23 is a schematic diagram showing transfer state of picture signal at the time of image display of an Internet information displaying apparatus of the invention.

At this time, the DMA controller 38a, as shown in FIG. 23, reads out color signals R, G, B of picture signal from the RAM 37, from one line before start of display on the display screen of the CRT 17 (upper right corner in FIG. 23) by DMA, and terminates writing into the video FIFO 29 during the period of invalid display region B (horizontal fly-back period) not displayed in the display screen of the CRT 17, and during the period of valid display region A displayed in the display screen of the CRT 17, the read controller 28 reads out from the video FIFO 29.

The synchronizing signal generator 25 gives the output showing whether the next display field is odd or even to the CPU 38 by interrupt processing at the interrupt timing of the vertical synchronizing signal. The CPU 38, according to the result, sets the address of the RAM 37 of the picture signal to be read out to the DMA controller 38a.

As a result of the above operation, the menu screen as shown in FIG. 9 appears on the display screen of the CRT 17. Among the pictures (icons) of "shop information", "travel and sightseeing", "news", "education", "amusement", "local and enterprise information", "original", "search", and "E-mail" of the menu screen, when the user selects and determines the icon of, for example, "travel and sightseeing" by operating the remote controller 20a, the Internet processing unit 22 displays the selection screen of "travel and sightseeing" as shown in FIG. 10 same as mentioned above. Similarly, thereafter, every time selection is decided on the selection screen, the lower selection screen is similarly displayed consecutively like a tree.

When the selection is determined and search is advanced on the selection screens, the icons relating to the searched items are read out from the ROM 39 and EEPROM 33 and displayed in the display screen. When the user operates the remote controller 20a and selects and determines from the icons, the CPU 38 reads out the telephone number of the server 4 of the provider from the EEPROM 33, and dials the telephone, and the provider's server 4 and Internet processing unit 22 are connected. When connected to the provider's server 4, the URL corresponding to the selected and decided icon is called and connected.

When the data of the home page of the connected URL is sent forth through the communication line 24 and modem 41, the CPU 38 converts the data into the picture signal, and sets in the RAM 37. The picture signal set in the RAM 37 is displayed in the display screen same as in the case of the menu screen.

When calling the URL not registered, the "URL input" of the menu screen of the browser mentioned below is selected and decided, and the URL is inputted.

While calling the telephone and URL, the display "Now in the process of connection" as shown in FIG. 13 or "Connection is complete" as shown in FIG. 14 appears at the bottom of the basic pattern in which the browser menu screen as shown in FIG. 18 is displayed at the top.

Herein, when the menu screen (FIG. 9) is displayed, for example, if the mode for showing the ordinary television program and Internet screen at the same time is designated by the channel selection CPU 20, the CPU 38 is interrupted by the interrupt controller 30.

The channel selection CPU 20 outputs a changeover signal at this time, and changes over the output from the switching unit 14 and the output from the switching unit 23 to the TV picture horizontal compression unit 18.

In the Internet television 1, the color signals R, G, B converted into red, green and blue color signals R, G, B by the video chroma processing unit 13 are given to the TV picture horizontal compression unit 18 through the switching unit 14.

The TV picture horizontal compression unit 18 generates a write clock of 4fsc at multiple frequency of the horizontal synchronizing signal given from the synchronizing separation and deflection processing unit 16, and writes in the color signals R, G, B of the picture signal by using it. When reading out the color signals R, G, B of the picture signal, a read clock of double frequency 8fsc of the write clock is generated, and the color signals R, G, B are read out from the start end of the scanning line by using it, and given to the picture right and left composing unit 19.

On the other hand, the Internet processing unit 22 reads out the picture signal for the portion of one screen of the menu screen from the ROM 39, when the CPU 38 is interrupted as the mode for displaying the ordinary television program and Internet screen at the same time is designated, sets in the RAM 37, and stops the synchronizing signal generator 25 and clock generator 26.

The Internet processing unit 22 is then given with the vertical synchronizing signal, horizontal synchronizing signal, and clock of 8fsc from the TV picture horizontal compression unit 18.

The interrupt controller 30, every time a horizontal synchronizing signal is given from the read controller 28, starts the DMA controller 38a incorporated in the CPU 38, reads out the color signals R, G, B of picture signal for the portion of one scanning line from the RAM 37 to give to the video FIFO 29 by DMA. In the video FIFO 29, the color signals R, G, B are written in at the timing generated by the write controller 27, and the read controller 28 reads out the picture signal from the timing of the middle point of the scanning line by the read clock of 8fsc, and the color signals R, G, B being read out are given to the picture right and left composing unit 19 through the switching unit 23.

The picture right and left composing unit 19 composes the picture signals given from the TV picture horizontal compression unit 18 and Internet processing unit 22 in the horizontal direction, and the composed picture signal is given to the RGB matrix 15, and outputted to the CRT 17 in every color. As a result, as shown in FIG. 12, the ordinary television program is shown in the left half of the display screen, and the Internet screen in the right half. This is not limited to the menu screen of the Internet, but is applicable in any screen of the Internet.

Figure 24:
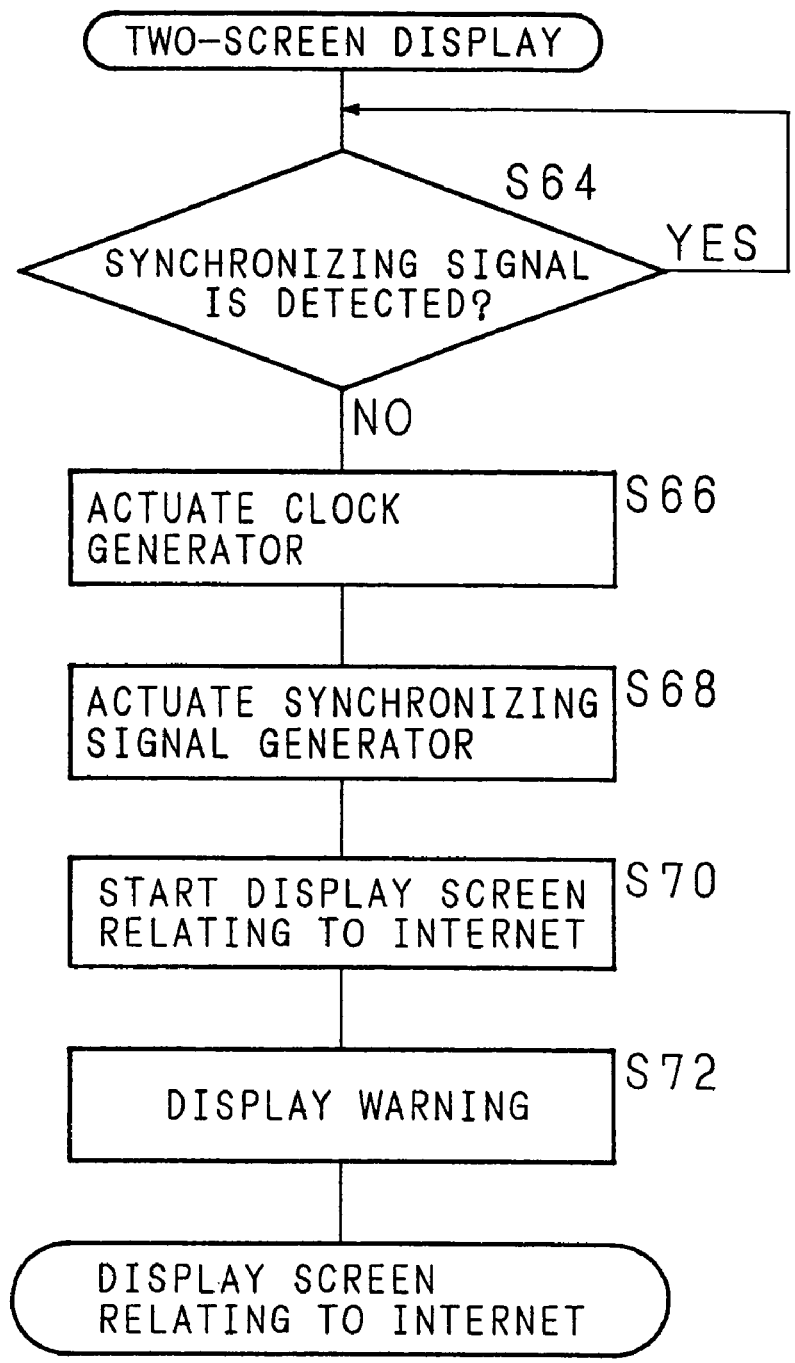
FIG. 24 is a flowchart showing operation of CPU when television broadcast is terminated in the mode of simultaneous display of an ordinary television program and Internet information of an Internet information displaying apparatus of the invention.

FIG. 24 is a flowchart showing the operation of the CPU 38 when the television broadcast is terminated in the mode of displaying the ordinary television program and Internet screen at the same time.

When the vertical synchronizing signal and horizontal synchronizing signal are not given from the read controller 28, the interrupt controller 30 judges that the television broadcast is terminated, and notices it to the CPU 38 by interrupt (S64). By this notice, the CPU 38 actuates the clock generator 26 and synchronizing signal generator 25 (S66, S68), and gives the vertical synchronizing signal, horizontal synchronizing signal, and clock to the write controller 27 and read controller 28.

Next, the CPU 38 notices it to the channel selection CPU 20, and causes the channel selection CPU 20 to output a changeover signal to stop the output from the switching unit 14, and the output from the switching unit 23 is outputted to the RGB matrix 15, so that the Internet screen is displayed in the entire display screen area (S70).

Figure 25:
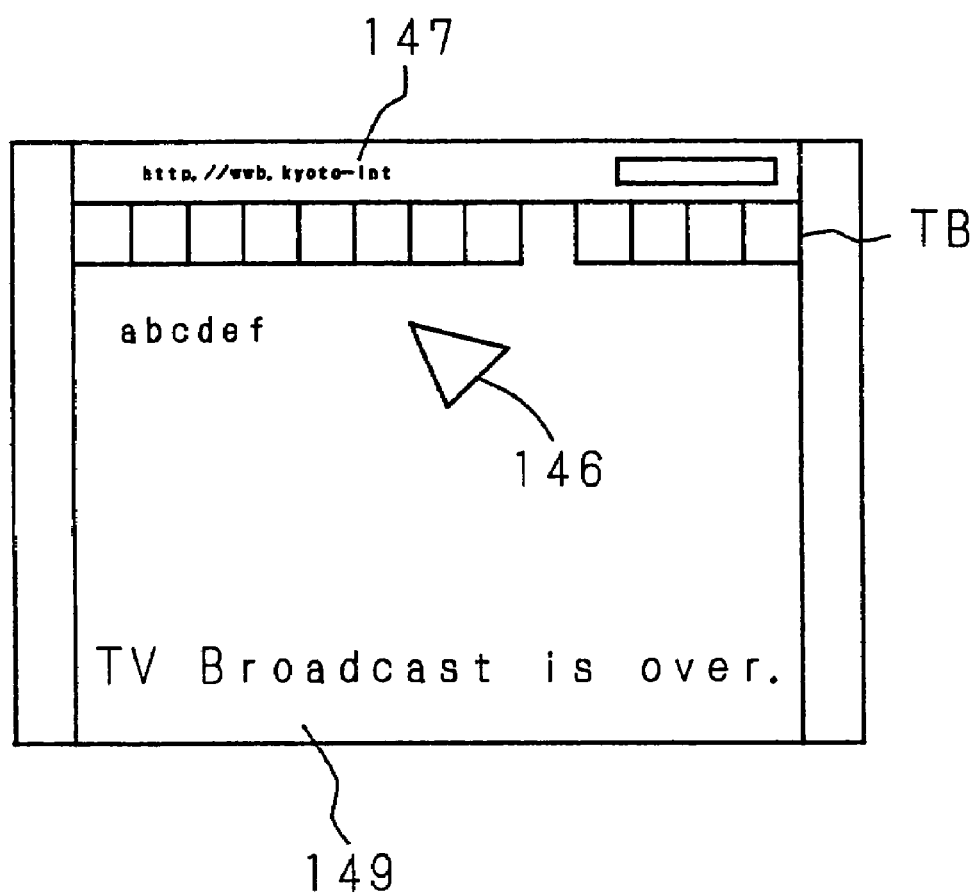
FIG. 25 is a schematic diagram showing a screen display example of an Internet information displaying apparatus of the invention.
Figure 26A:
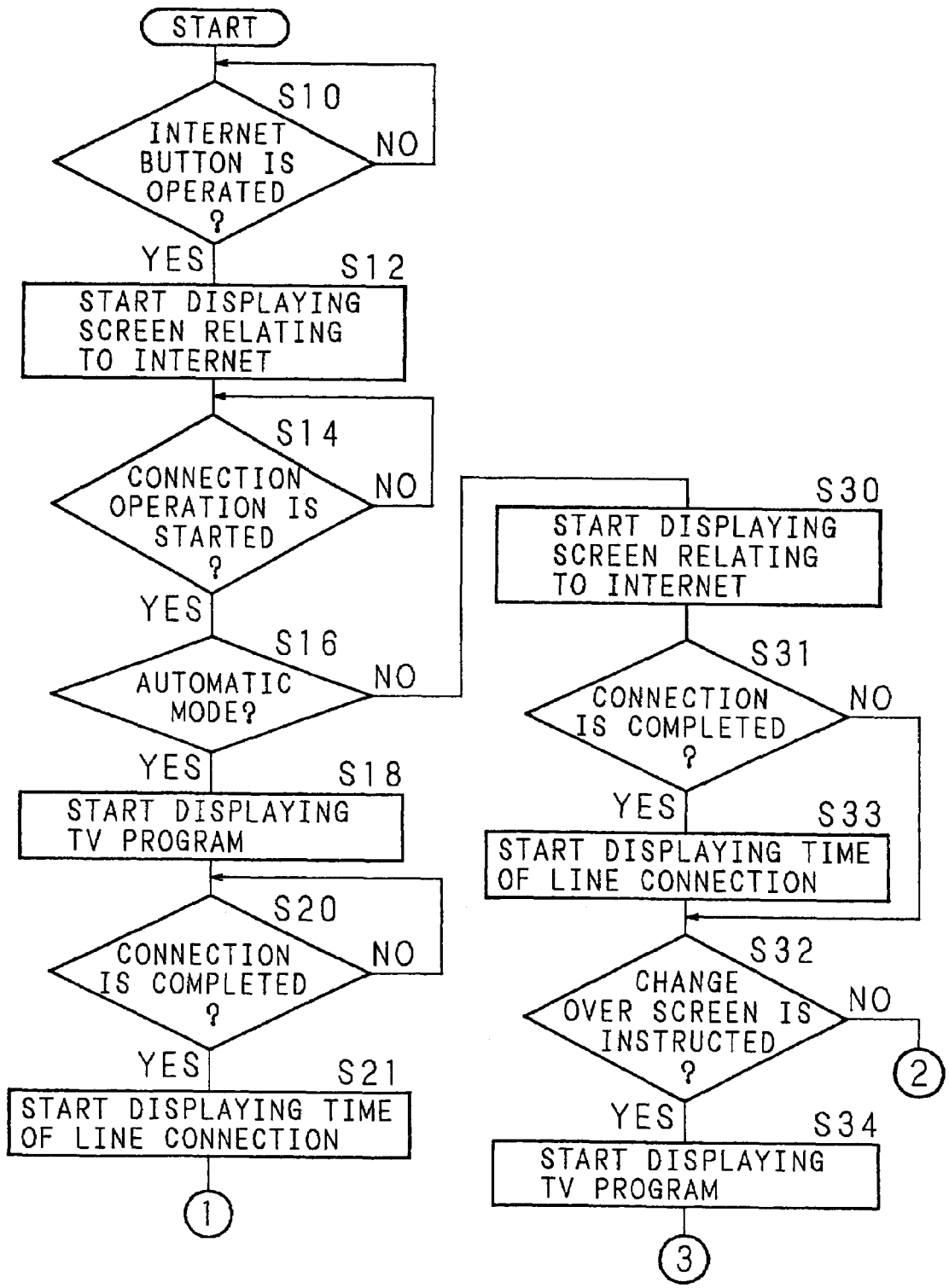
FIG. 26A is a flowchart showing the procedure of screen display from the operation of an Internet button of an Internet information displaying apparatus of the invention.
Figure 26B:
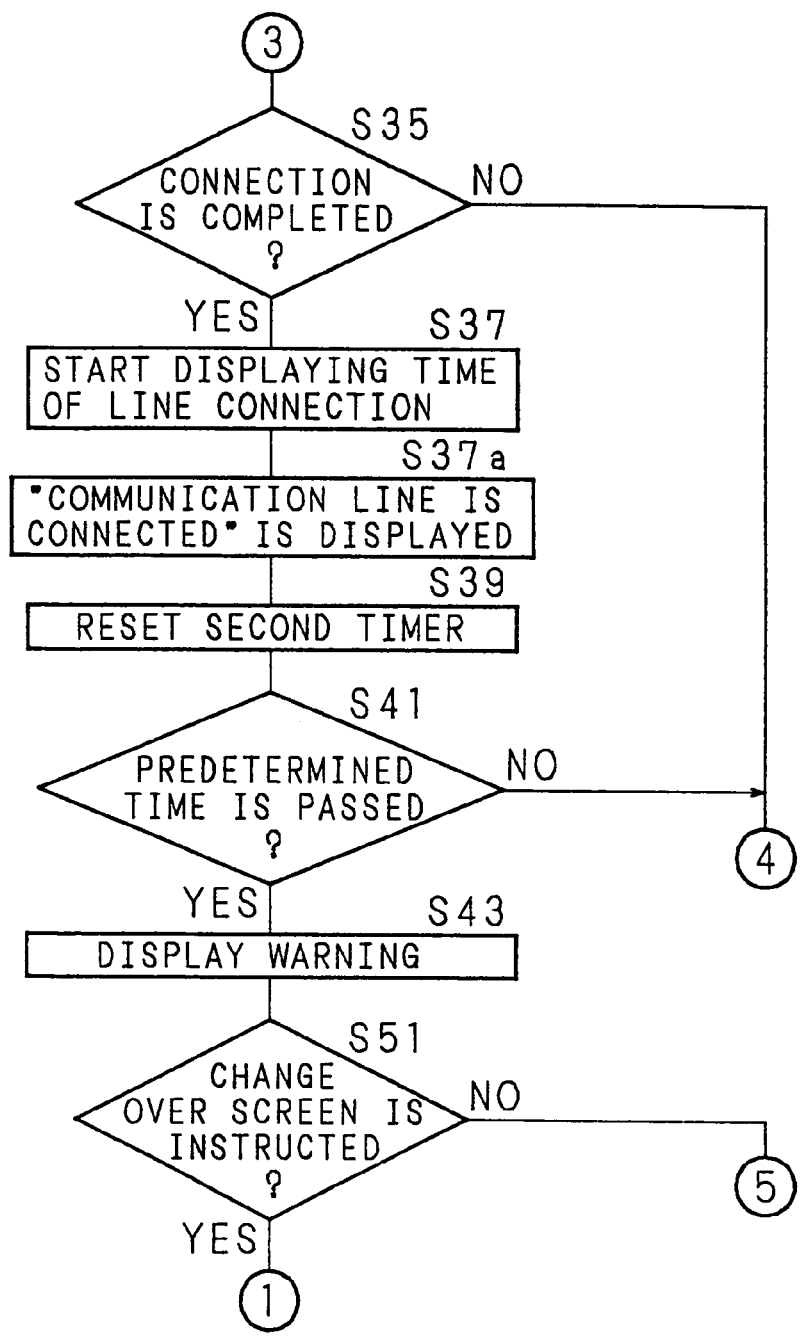
FIG. 26B is a flowchart showing the procedure of screen display from the operation of an Internet button of an Internet information displaying apparatus of the invention.
Figure 27A:
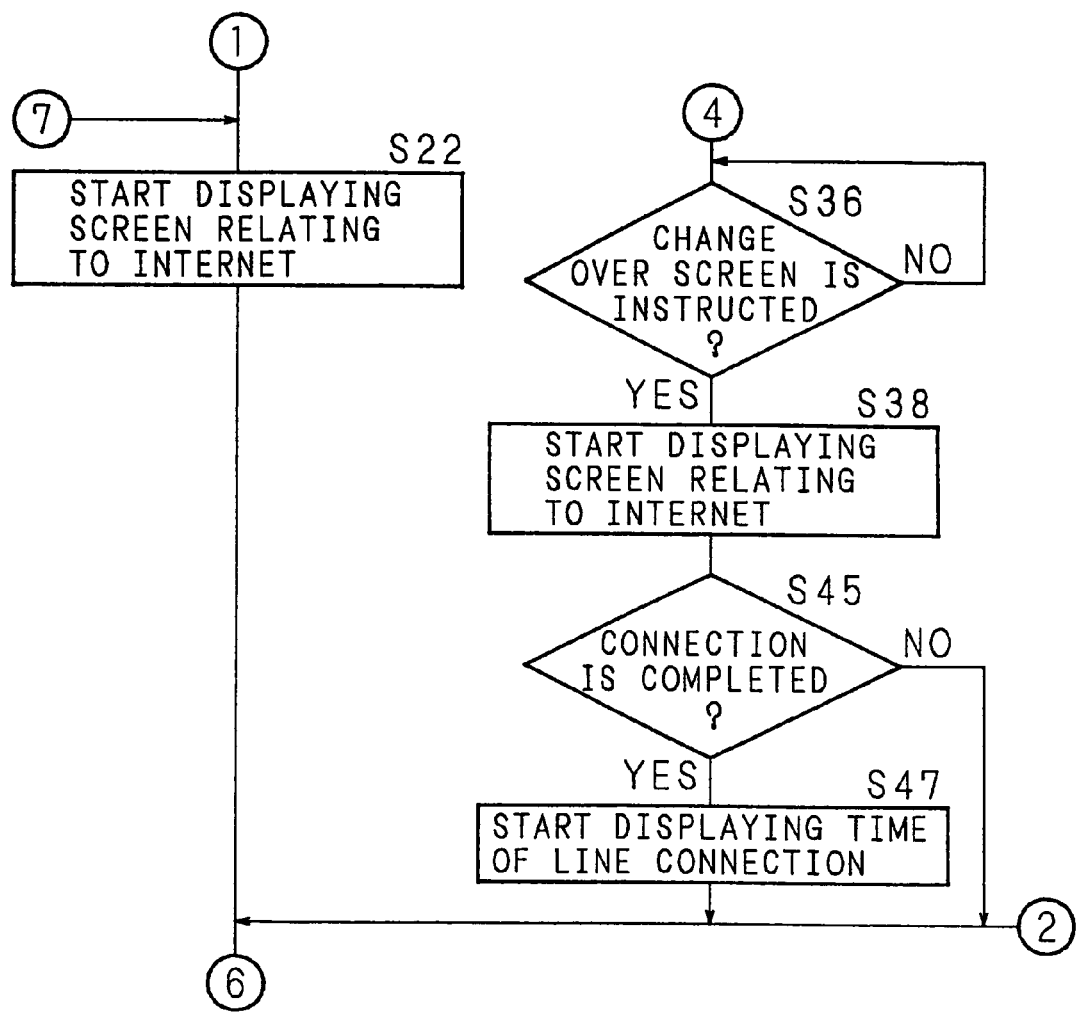
FIG. 27A is a flowchart showing the procedure of screen display from the operation of an Internet button of an Internet information displaying apparatus of the invention.
Figure 27B:
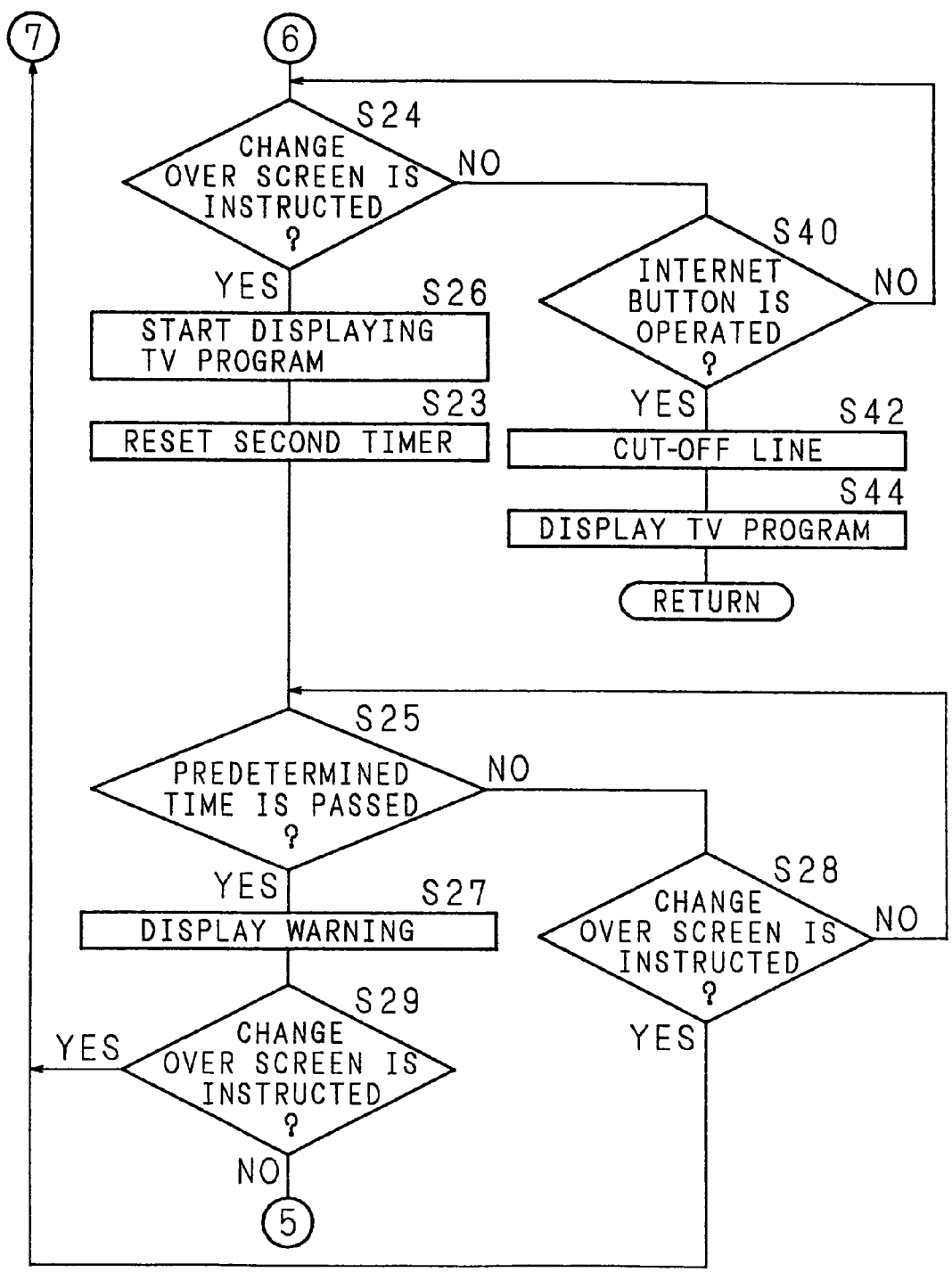
FIG. 27B is a flowchart showing the procedure of screen display from the operation of an Internet button of an Internet information displaying apparatus of the invention.
Figure 28:
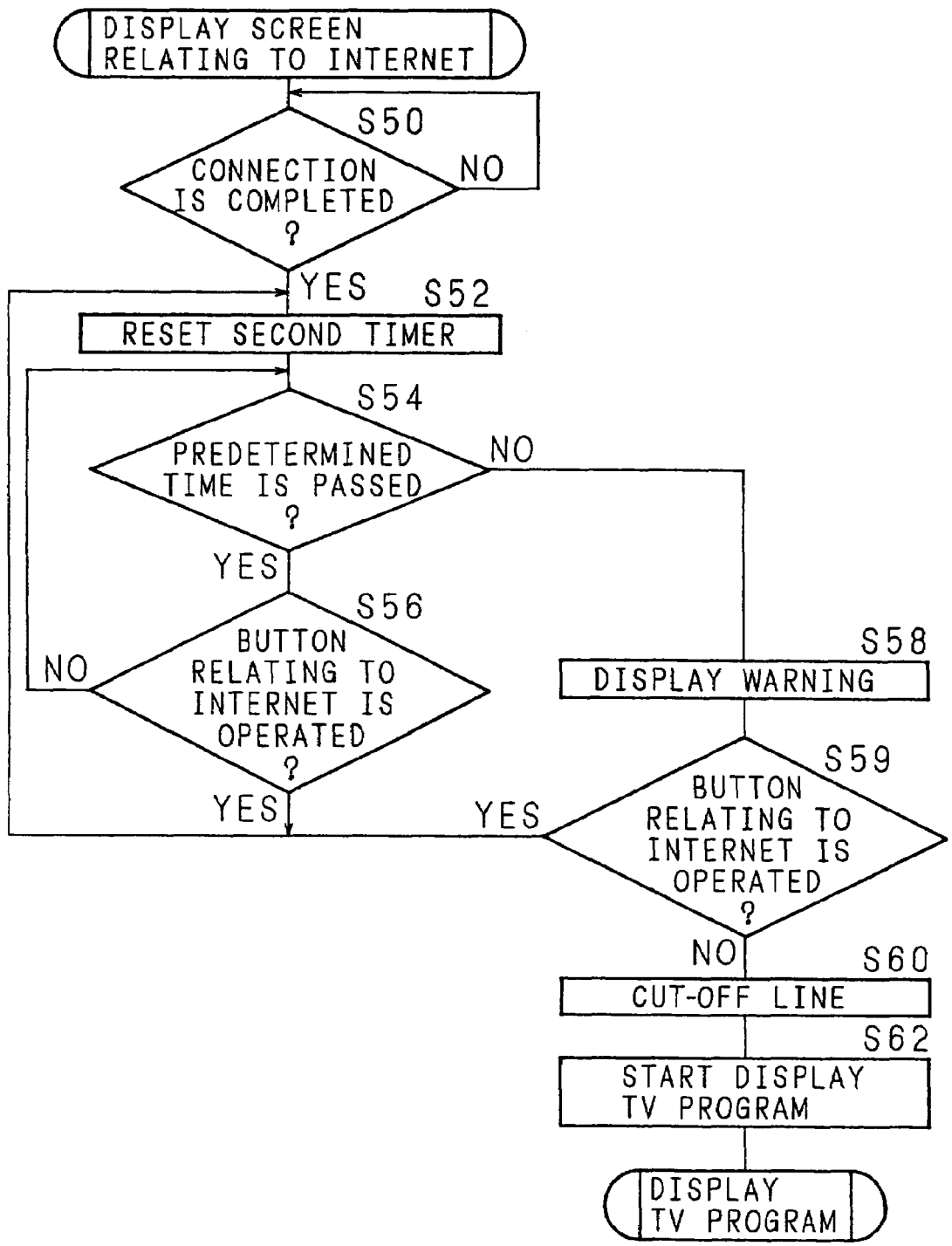
FIG. 28 is a flowchart showing the procedure of screen display from the operation of an Internet button of an Internet information displaying apparatus of the invention.

Consequently, the CPU 38 causes the channel selection CPU 20 to display a warning (caution) such as "TV broadcast is over" at the lower end of the screen showing the Internet information as shown in FIG. 25 through the OSD controlling unit 21 (S72).

The other operations of the Internet television 1 are same as in the mode of operating as an ordinary televisions mentioned above and the mode of displaying the Internet screen in the full display screen, and the explanations are omitted.

FIG. 26A, FIG. 26B, FIG. 27A, FIG. 27B, and FIG. 28 are flowcharts showing the operation about the display screen of the CPU 38 and CPU 50 of channel selection CPU 20 from the moment of operation of the Internet button. The operation about the display screen of the CPU 38, CPU 50 is described below by referring to these flowcharts.

The CPU 50 outputs a changeover signal to the switching unites 14, 23 when the Internet button of the remote controller 20a is operated (S10), and starts screen display from the Internet processing unit 22 (S12).

When the URL is selected and determined or entered, and the connection operation of the communication line 24 starts (S14), when the screen changeover mode during connection operation is set in the automatic mode in the channel selection CPU 20 (S16), the CPU 50 operates the switching unites 14, 23, and starts screen display of the television program (S18).

When the connection of the communication line 24 is complete (S20), the CPU 50 resets and starts the first timer 52, and the time clocked by the first timer 52 is displayed on the screen in the unit of, for example, 1 minute through the OSD controlling unit 21 (S21).

When the data of the home page of the called URL is sent through the communication line 24 and modem 41, the CPU 38 converts the data into picture signal, and sets in the RAM 37. The image signal set in the RAM 37 is displayed in the display screen same as in the case of menu screen (S22).

When the screen changeover mode during connection operation is set in the manual mode in the channel selection CPU 20 (S16), the CPU 50 displays "Now in the process of connection" as shown in FIG. 13 or "Connection is complete" as shown in FIG. 14 through the OSD controlling unit 21 at the lower end of the basic pattern in which the browser menu screen as shown in FIG. 18 is displayed at the upper end (S30). In this state, when the connection of the communication line 24 is complete (S31), the CPU 50 resets and starts the first timer 52, and the time clocked by the first timer 52 is displayed on the screen in the unit of, for example, 1 minute through the OSD controlling unit 21 (S33).

In this state, when the remote controller 20*a* is operated, and the screen changeover is instructed (S32), the CPU 50 operates the switching unites 14, 23, and starts screen display of television program (S34). In this state, when the connection of the communication line 24 is complete (S35) (if connection is already complete, connection is not complete at this point, as a matter of course), the CPU 50 resets and starts the first timer 52, and the time clocked by the first timer 52 is displayed on the screen in the unit of, for example, 1 minute through the OSD controlling unit 21 (S37).

Consequently, the CPU 50 displays "Connection is complete" same as shown in FIG. 14 at the lower end of the screen of the television program through the OSD controlling unit 21 (S37*a*).

Figure 29:
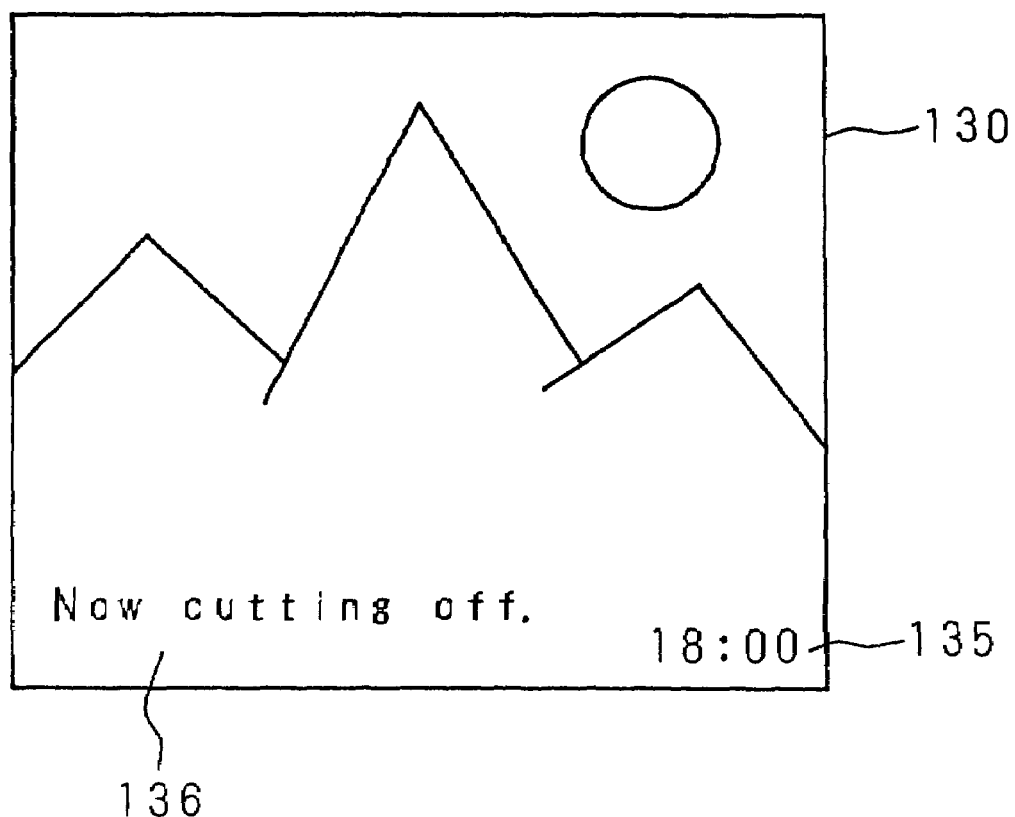
FIG. 29 is a schematic diagram showing a screen display example of an Internet information displaying apparatus of the invention.

At the same time, the CPU 50 resets and starts the second timer 57 (S39). After starting the second timer 57 (S39), upon lapse of a predetermined time (for example, 6 minutes) (S41), the warning of "Now cutting off" as shown in FIG. 29 is displayed for 1 minute, for example, at the lower end of the screen of the television program through the OSD controlling unit 21 (S43). In this period of 1 minute, the remote controller 20*a* is operated, and when the screen changeover is instructed (S51), the CPU 50 operates the switching unites 14, 23, and starts display of the screen about the Internet (S22).

When the screen changeover is not instructed (S51), the CPU 38 cuts off the communication line 24 (S42), and displays the television program successively, or starts display of television program (S44).

After starting the second timer 57 (S39), until a specific time (for example, 6 minutes) passes (S41), when the remote controller 20*a* is operated and the screen changeover is instructed (S36), the CPU 50 operates the switching unites 14, 23, and starts the display of screen about the Internet (S38).

When the screen changeover is not instructed (S32), the CPU 50 continues to display the screen about the Internet, and waits for next instruction.

When the connection of the communication line 24 is not complete (S35), and the remote controller 20*a* is operated to instruct the screen changeover (S36), the CPU 50 operates the switching unites 14, 23, and starts display of the screen about the Internet (S38). At this time, the display "Connecting to the provider" or "Line connection" or "Searching address" is shown through the screen display 21 (S38).

In this state, when the connection of the communication line 24 is complete (S45), (if connection is already complete, connection is not complete at this point, as a matter of course), the CPU 50 resets and starts the first timer 52, and the time clocked by the first timer 52 is displayed on the screen in the unit of, for example, 1 minute through the OSD controlling unit 21 (S47).

In the state of the screen display from the Internet processing unit 22 (S22, S38), when the remote controller 20*a* is operated and the screen changeover is instructed (S24), the CPU 50 operates the switching unites 14, 23, and starts the screen display of the television program (S26).

At the same time, the CPU 50 resets and starts the second timer 57 (S23). After starting the second timer 57 (S23), upon lapse of a predetermined time (for example, 6 minutes) (S25), the warning of "Now cutting off" as shown in FIG. 29 is displayed for 1 minute, for example, at the lower end of the screen of the television program through the OSD controlling unit 21 (S27).

In this period of 1 minute, the remote controller 20*a* is operated, and when the screen changeover is instructed (S29), the CPU 50 operates the switching unites 14, 23, and starts display of the screen about the Internet (S22).

When the screen changeover is not instructed (S29), the CPU 38 cuts off the communication line 24 (S42), and displays the television program successively, or starts display of television program (S44).

After starting the second timer 57 (S23), until a predetermined time (for example, 6 minutes) passes (S25), when the remote controller 20*a* is operated and the screen changeover is instructed (S28), the CPU 50 operates the switching unites 14, 23, and starts the display of screen about the Internet (S22).

In the state of screen display from the Internet processing unit 22 (S22, S38), when the Internet button of the remote controller 20*a* is operated (S40), the CPU 38 cuts off the communication line 24 (S42), and the CPU 50 operates the switching unites 14, 23, and starts the screen display of the television program (S44).

The CPU 38 and CPU 50, when the screen is displayed from the Internet processing unit 22, make the following operation aside from the operation mentioned above.

The CPU 50, when the connection of the communication line 24 is complete (S50) while the screen from the Internet processing unit 22 is displayed, resets and starts the second timer 57 (S52), and, until the second timer 57 clocks, for example, 6 minutes (S54), if the Internet button is operated (S56), it resets and starts the second timer 57 again (S52), and starts clocking of 6 minutes (S54).

Until the second timer 57 clocks 6 minutes (S54), if the button relating to the Internet is not operated (S54), the CPU 50 displays the warning "Now cutting off" same as shown in FIG. 29, for 1 minute, for example, at the lower end of the screen relating to the Internet through the OSD controlling unit 21 (S58). In this period of 1 minute, when the remote controller 20*a* is operated and the screen changeover is instructed (S59), the CPU 50 resets and starts the second timer 57 again (S52), and starts clocking of 6 minutes (S54).

When the screen changeover is not instructed (S59), the CPU 38 cuts off the communication line 24 (S60), and the CPU 50 operates the switching unites 14, 23, and starts screen display of the television program (S62).

Figure 30:
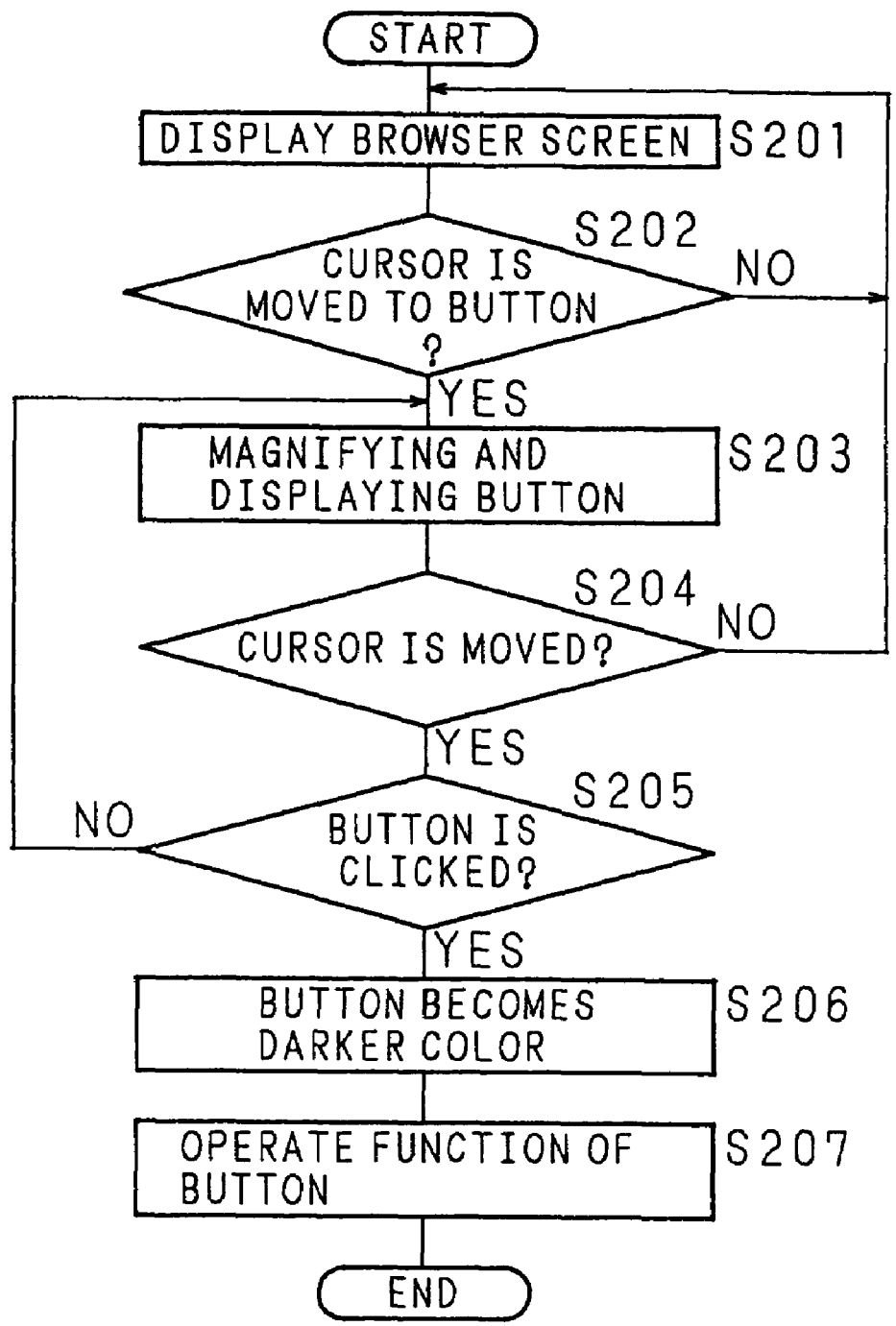
FIG. 30 is a flowchart showing the procedure of displaying of tool bar of an Internet information displaying apparatus of the invention.

Referring now to the flowchart in FIG. 30, the operation in tool bar TB operation is described below.

While the Internet screen is displayed, the browser menu screen as shown in FIG. 18 is displayed at the upper end of the display screen as required (S201). This menu screen display buttons showing the icons representing, sequentially from the left end, "Return", "Advance", "Read again", "Read image again", "URL input", "URL register", "Stop", "End", "Move down", "Move up", "Move left", and "Move right".

Figure 31:
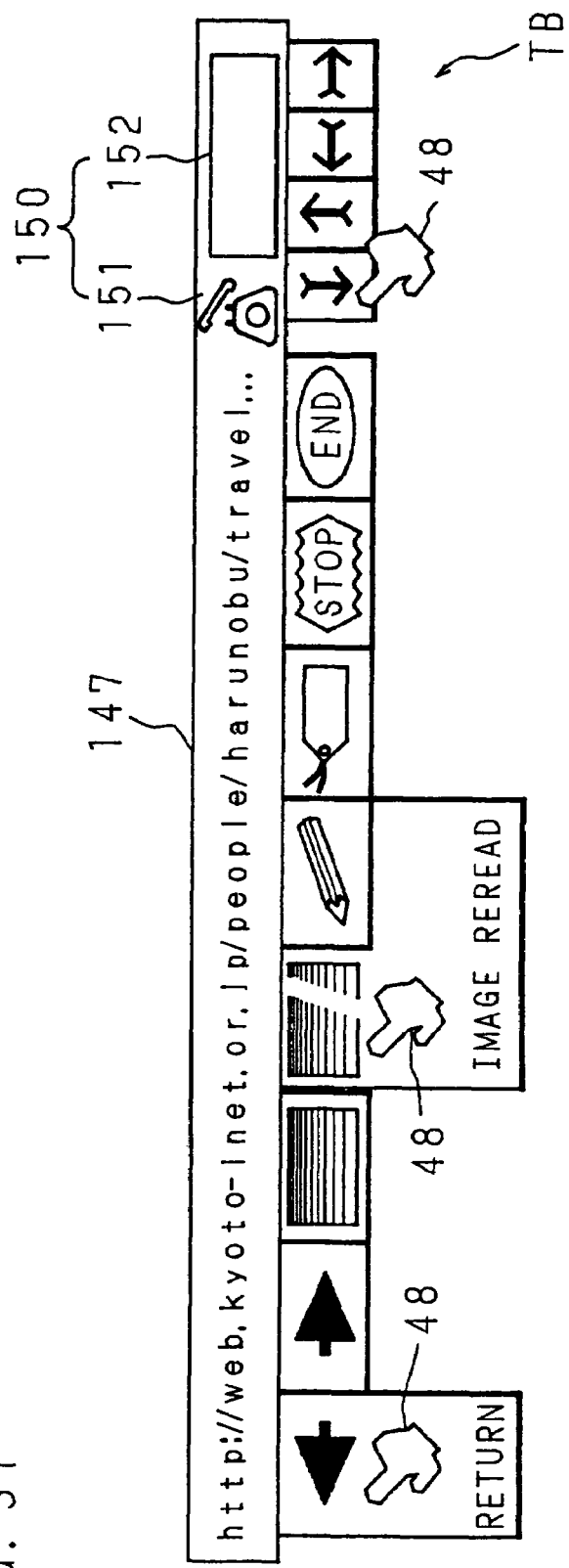
FIG. 31 is a schematic diagram showing a display example of tool bar of an Internet information displaying apparatus of the invention.

By operating the selection button 43 and moving the pointer 46 to any of the buttons (S202), as shown in FIG. 31, the button is extended widely in the lower direction (S203), showing that the button is being selected. However, the buttons for "Move down", "Move up", "Move left", and "Move right" are not extended widely in the lower direction.

Once the button is selected and determined, to jump to other screen, the pointer 46 shown in FIG. 18 is changed to the "index" pointer 48 as shown in FIG. 31.

Figure 32:
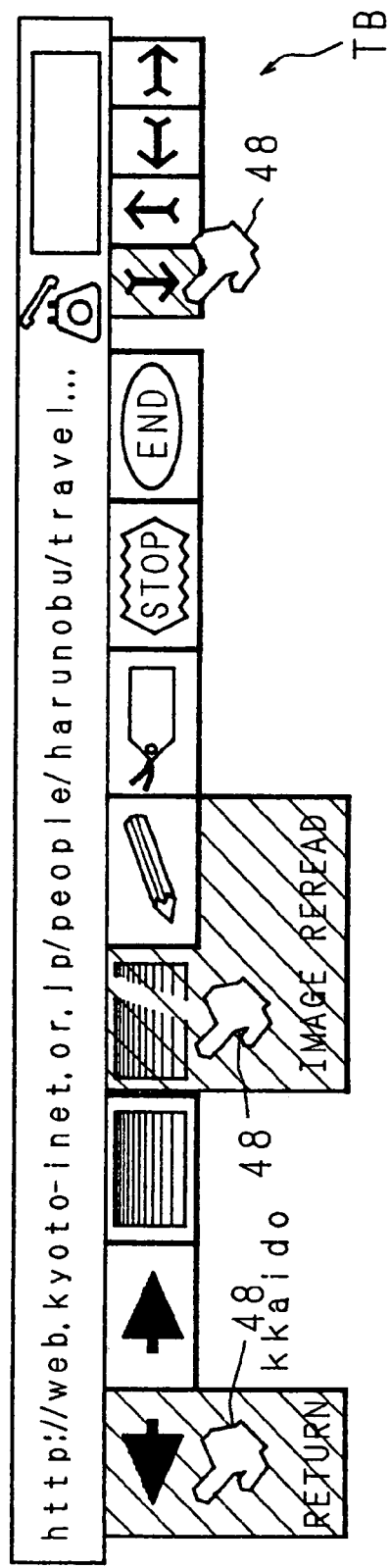
FIG. 32 is a schematic diagram showing a display example of tool bar of an Internet information displaying apparatus of the invention.

In the state of the button extended widely in the lower direction and selected (NO in S204), when the decision button 44 is operated (clicked) (S205), the button is once depressed as shown in FIG. 32, and the button becomes a darker color than usually, and the shadow and highlight are reversed (S206). As a result, the selection and determination of the button are displayed.

Figure 33:
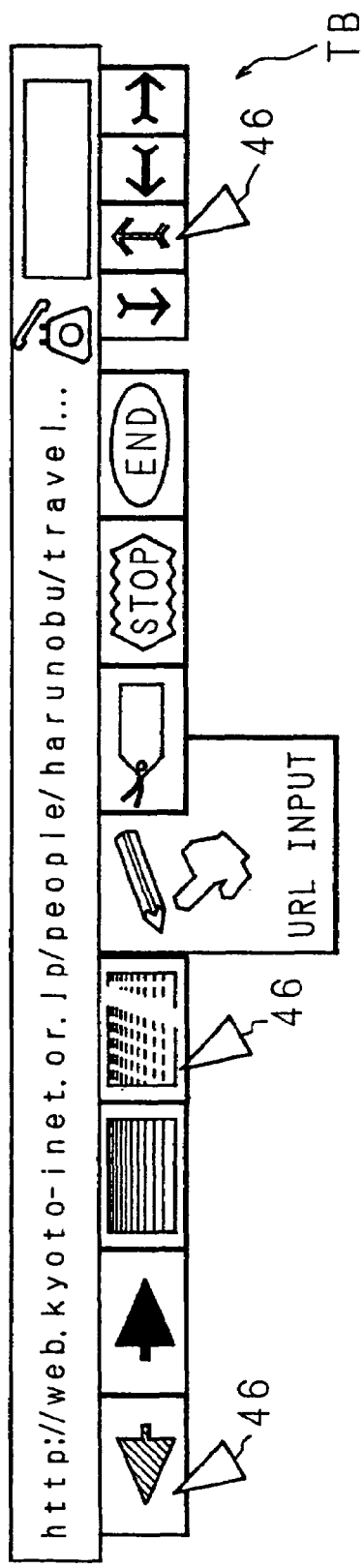
FIG. 33 is a schematic diagram showing a display example of tool bar of an Internet information displaying apparatus of the invention.

When the button is not related to any action, by moving the pointer 46 to the button (YES in S204), as shown in FIG. 33, the pointer 46 is not changed, and the dark and bright parts of the icon of the button are once reversed to urge caution.

Figure 34:
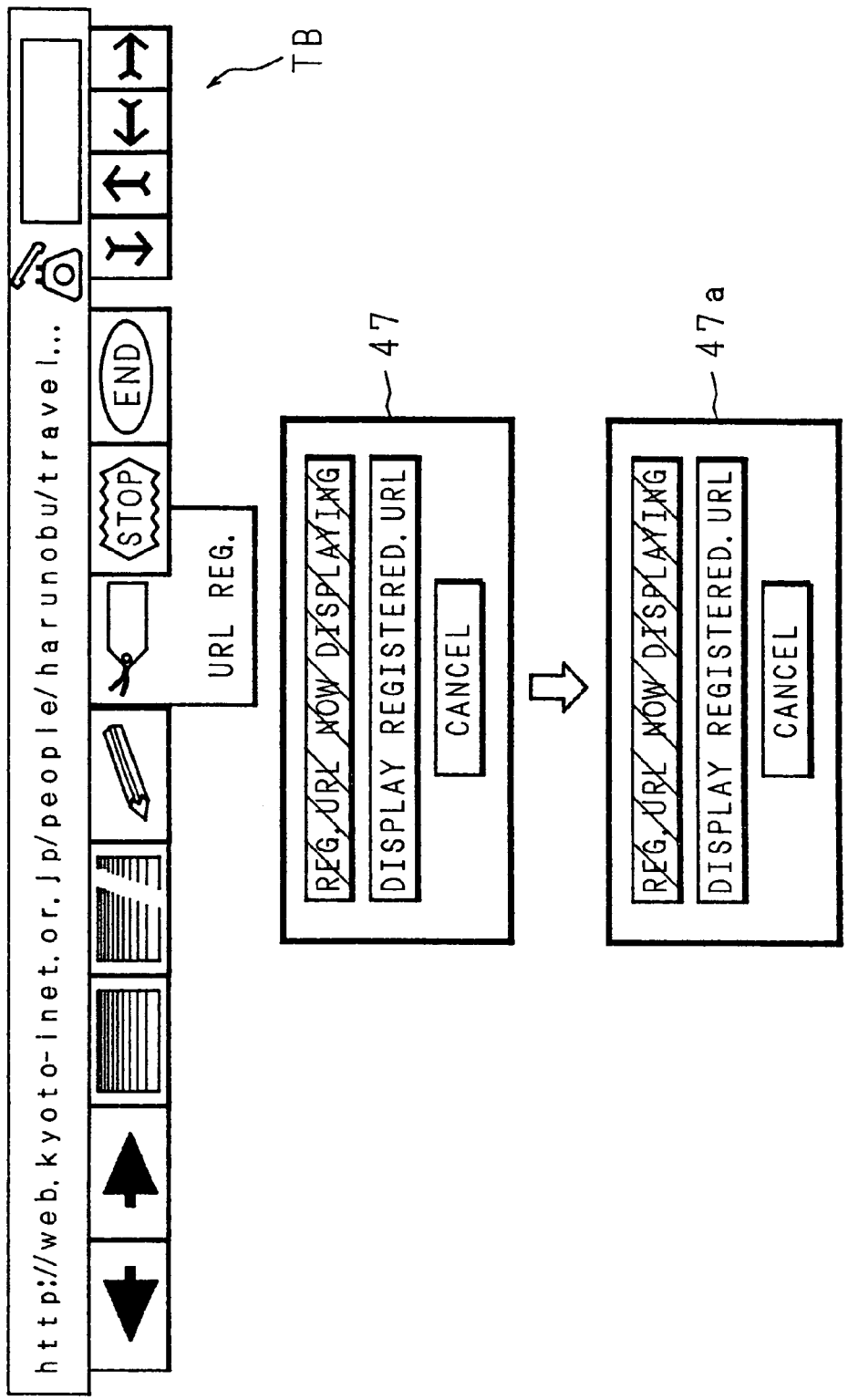
FIG. 34 is a schematic diagram showing a display example of tool bar of an Internet information displaying apparatus of the invention.

FIG. 34 is other explanatory diagram of the browser menu screen. In this menu screen, when the button is selected and determined, a large button relating to that button is displayed together with the panel 47. At this time, the key cursor moves only on the large button by the operation of the selection button 43, and when the key cursor moves onto the button, the button becomes bright to display that the button is selected (panel 47). In this state, when the decision button 44 is operated, the button is once depressed, showing that the button is selected and determined (panel 47a).

Figure 35:
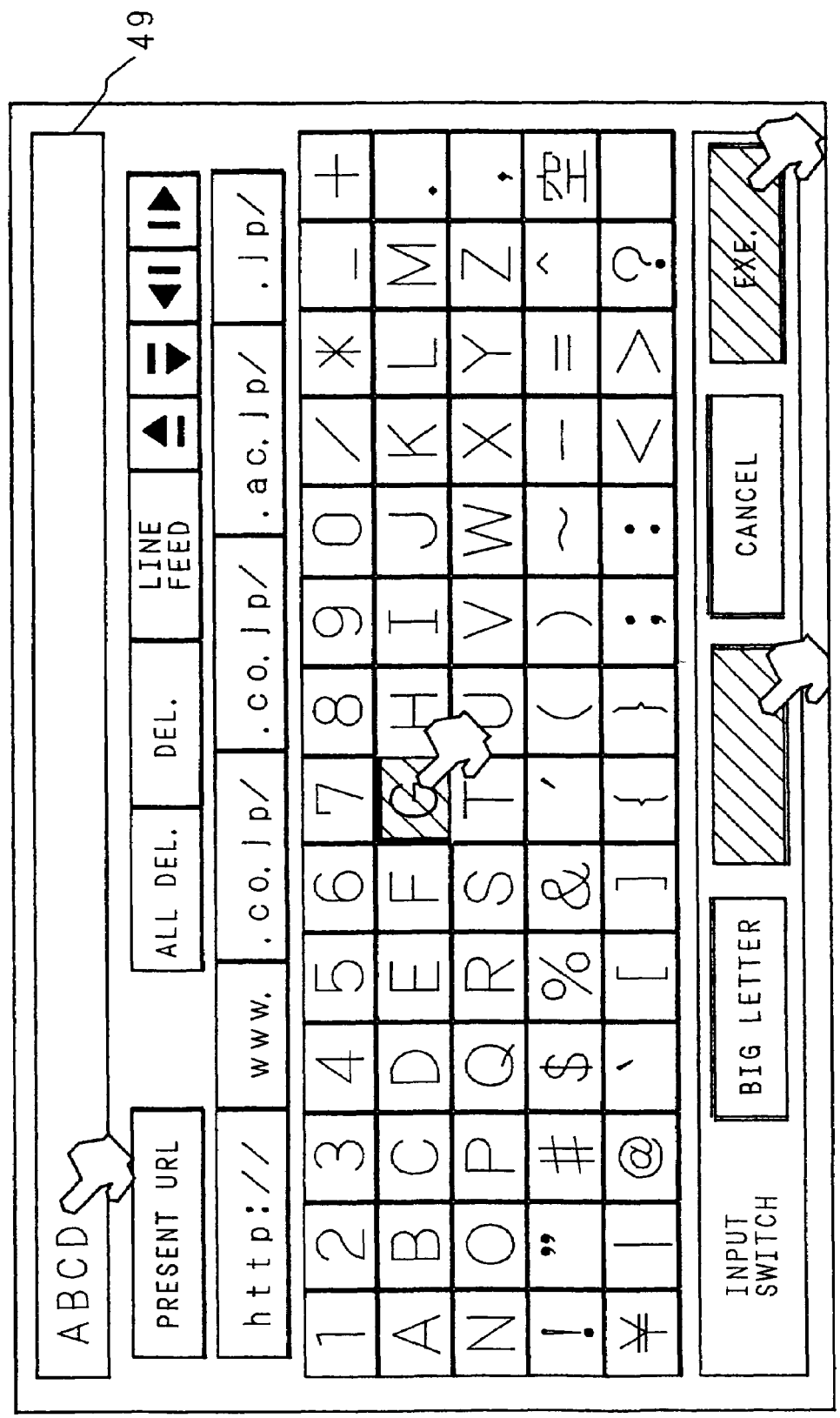
FIG. 35 is an explanatory diagram of a character palette.

FIG. 35 and FIG. 36 are explanatory diagrams of character palette. The character palette is displayed by selecting and determining the character input button when character input is necessary in the case of URL input and making an E-mail. In the character palette, buttons are assigned for every character, symbol and operation item. FIG. 35 shows a character palette of alphanumerics and capitals, and FIG. 36 shows a character palette of transfer of Chinese characters, and moreover character palettes for alphanumerics and lower cases, hiragana, and others are displayed by selecting and determining the operation item button as required.

The pointer is preliminarily moved to the position where character input is necessary, the decision button 44 is operated, and the cursor display is changed within the screen frame where character input is necessary. In this state, when the character input button is selected and determined, the character palette is displayed, and the index pointer is moved onto the button by the operation of the selection button 43, and the decision button 44 is operated, and then the button is once depressed and the color becomes dark for a moment, showing that the button is selected and determined. The character corresponding to the button selected and determined is displayed in the input display column 49, and the character input is entered into the required screen frame.

In the foregoing embodiments, the Internet information displaying apparatus of the invention is applied to the television receiver, but this is not limitative. For example, contrary to the embodiments, it is also possible to realize by incorporating a function of television receiver in an ordinary personal computer capable of communicating through the Internet.

As this invention may be embodied in several forms without departing from the spirit of essential characteristics thereof, the present embodiments is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An Internet information displaying method for receiving internet information, displaying it on the screen, and displaying a tool bar composed of plural buttons each representing control function on the screen, comprising steps of:
   selecting an arbitrary button in said tool bar; and
   magnifying only said selected button into a predetermined size in longitudinal and lateral directions and displaying said selected, magnified button.

2. The Internet information displaying method as set forth in claim 1, wherein the displaying state of the selected button is magnified in the direction toward the center of the screen at said step of magnifying and displaying said selected button.

3. The Internet information displaying method as set forth in claim 1, wherein characters for expressing the function of the button are also displayed at said step of magnifying and displaying said selected button.

4. The Internet information displaying method as set forth is claim 1, further comprising step of varying the displaying state of said magnified and displayed button when executing the function of said selected button.

5. The Internet information displaying method as set forth in claim 4, wherein said selected button is displayed in a depressed state from the screen at the step of varying the displaying state of said magnified and displayed button when executing the function of said selected button.

6. A method as recited in claim 1, wherein said step of selecting an arbitrary button to be the selected button in the tool bar comprises selecting said arbitrary button with a wireless remote control.

7. An Internet information displaying method for receiving Internet information, displaying it on the screen, and displaying a tool bar composed of plural buttons each representing control function on the screen, comprising the steps of:
   selecting, by a remote control, an arbitrary button in said tool bar; and
   magnifying only said selected button into a predetermined size in longitudinal and lateral directions and displaying said selected, magnified button.

8. An Internet information displaying method for receiving Internet information, displaying it on the screen, and displaying a tool bar composed of plural buttons each representing control function on the screen, comprising the steps of:
   selecting an arbitrary button in said tool bar; and
   magnifying, in longitudinal and lateral directions, and displaying the selected button upon a single user action.

9. The Internet information displaying method as set forth in claim 8, wherein the displaying state of the selected button is magnified and moved in the direction toward the center of the screen at said step of magnifying and displaying said selected button.

* * * * *